(12) United States Patent
Bliss et al.

(10) Patent No.: US 11,256,463 B2
(45) Date of Patent: *Feb. 22, 2022

(54) CONTENT PRIORITIZATION FOR A DISPLAY ARRAY

(71) Applicant: Amazon Technologies, Inc., Seattle, WA (US)

(72) Inventors: David Edward Bliss, Albany, CA (US); Michael Douglas McQueen, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/098,513

(22) Filed: Nov. 16, 2020

(65) Prior Publication Data

US 2021/0165624 A1 Jun. 3, 2021

Related U.S. Application Data

(63) Continuation of application No. 16/735,167, filed on Jan. 6, 2020, now Pat. No. 11,048,459, which is a
(Continued)

(51) Int. Cl.

| | |
|---|---|
| *G09G 5/00* | (2006.01) |
| *G06F 3/14* | (2006.01) |
| *G10L 15/26* | (2006.01) |
| *G10L 15/22* | (2006.01) |
| *G06F 16/955* | (2019.01) |

(Continued)

(52) U.S. Cl.
CPC .............. *G06F 3/1423* (2013.01); *G06F 3/16* (2013.01); *G06F 3/167* (2013.01); *G06F 16/9566* (2019.01); *G10L 15/22* (2013.01); *G10L 15/26* (2013.01); *G06F 3/04883* (2013.01); *G06F 3/1454* (2013.01); *G09G 2354/00* (2013.01);
(Continued)

(58) Field of Classification Search
CPC ............. G06F 16/9566; G06F 3/04883; G06F 3/1423; G06F 3/1454; G06F 3/16; G06F 3/167; G09G 2354/00; G09G 2356/00; G09G 2370/042; G10L 15/22; G10L 15/26; G10L 2015/223
See application file for complete search history.

(56) References Cited

U.S. PATENT DOCUMENTS

| | | | |
|---|---|---|---|
| 2009/0144387 A1* | 6/2009 | Smith ................. | G06F 16/9535 709/207 |
| 2016/0188639 A1* | 6/2016 | Levy .................. | H04N 1/32283 707/803 |

* cited by examiner

*Primary Examiner* — Insa Sadio
(74) *Attorney, Agent, or Firm* — Pierce Atwood LLP

(57) ABSTRACT

Systems and methods for displaying prioritized content using a display array are described herein. In some embodiments, a display array may include two or more display devices, which may render content thereby. If an update or change to the content occurs, or if new content is requested, then that content may be assigned a higher priority level. A computing system may include a device management system that continually monitors the availability of the various display devices of the display array, and based on the content received by an applications management system of the computing system, determines which display device should render which content. For instance, an update to content displayed on a second display device may be caused to be displayed on a first display device in response to the device management system determining that the first display device is to be used for displaying high priority content.

20 Claims, 8 Drawing Sheets

Related U.S. Application Data continuation of application No. 16/001,449, filed on Jun. 6, 2018, now Pat. No. 10,558,417, which is a continuation of application No. 15/266,459, filed on Sep. 15, 2016, now Pat. No. 9,996,310.

(51) Int. Cl.
*G06F 3/16* (2006.01)
*G06F 3/04883* (2022.01)

(52) U.S. Cl.
CPC ... *G09G 2356/00* (2013.01); *G09G 2370/042* (2013.01); *G10L 2015/223* (2013.01)

CONTENT PRIORITIZATION FOR A DISPLAY ARRAY

CROSS REFERENCE TO RELATED APPLICATION

This application is a continuation of, and claims the benefit of priority of, U.S. Non-provisional patent application Ser. No. 16/735,167, filed Jan. 6, 2020, and entitled "CONTENT PRIORITIZATION FOR A DISPLAY ARRAY", which is a continuation of, and claims the benefit of priority of, U.S. Non-provisional patent application Ser. No. 16/001,449, filed Jun. 6, 2018 and entitled "CONTENT PRIORITIZATION FOR A DISPLAY ARRAY", which has since issued as U.S. Pat. No. 10,558,417, which is a continuation of, and claims the benefit of priority of, U.S. Non-provisional patent application Ser. No. 15/266,459, filed Sep. 15, 2016 and entitled "CONTENT PRIORITIZATION FOR A DISPLAY ARRAY," which has since issued as U.S. Pat. No. 9,996,310. The contents of each of the above are herein expressly incorporated by reference in their entireties.

BACKGROUND

Content may be displayed using a display device. Display arrays including multiple display devices may be capable displaying content thereby. Such display arrays may be configured by a user such that a position of each display device of the display array may be known.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1A:
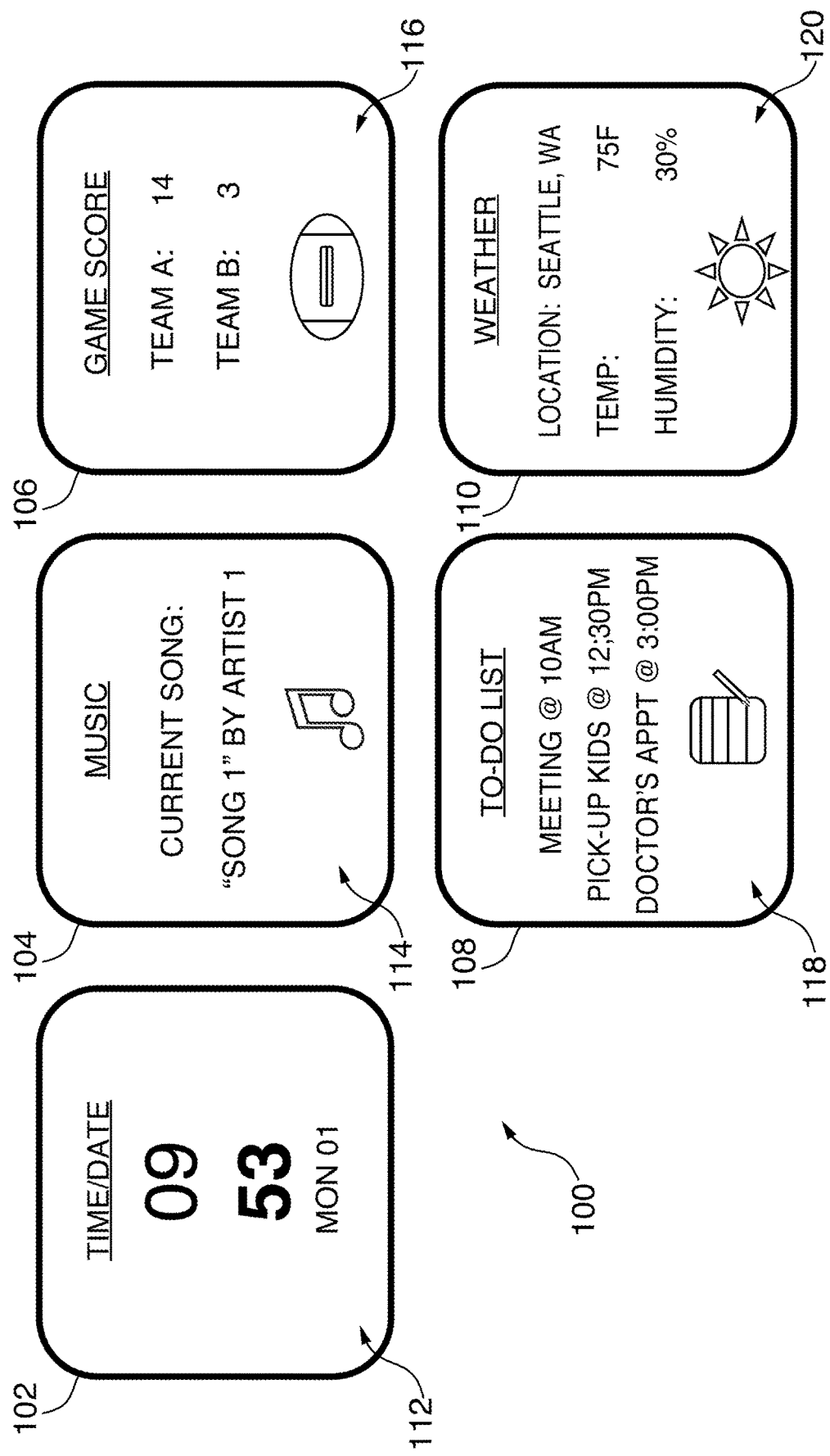
FIGS. 1A and 1B are illustrative diagrams of a display array for displaying content using various display devices, and displaying a new content associated with content displayed by the display array, respectively, in accordance with various embodiments.

The present disclosure, as set forth below, is generally directed to various embodiments of methods and systems for displaying content using one or more display devices, where the display devices may be arranged as a display array. Higher priority content may be displayed using a particular display device of a display array, while lower priority content may be displayed using a different display devices of the display array.

In some embodiments, content having a high priority level (e.g., high priority content) may be displayed using a particular display device or display devices based on a predefined prioritization relationship of display devices that form a multi-display device array. Such display arrays may include, for example, two or more display devices (e.g., three, four, five, etc.) arranged in any suitable manner. An individual may assign certain display devices of the display array for displaying higher priority content than other display devices. For instance, one display device may be used for displaying high priority content, while another display device may be used for displaying non-high priority content.

As described herein, "high priority" content may correspond to recently updated content, new content, revised content, and/or any other suitable content that may be capable of being displayed using one or more display devices of a display array. In one embodiment, higher priority content may be displayed in a more prominent manner than lower priority content. For example, if content that is currently being displayed on a particular display device is updated, that content may be considered higher priority content. As another example, if content is requested by a user, then that content may also correspond to higher priority content. As still yet another example, content that has recently been interacted with (e.g., corresponding to a most recently used application), may be of higher priority than content that has not been interacted (e.g., corresponding to a next most recently used application).

In some embodiments, certain content may require a particular display device or multiple display devices to be properly rendered. In other words, certain content may need to be displayed by a display device having a display screen of a particular size, or using more than one display device arrange in particular manner so that the content will be properly viewable by an individual. For example, a display array may include one high-definition display device, capable of displaying high resolution images and/or videos, and one or more non-high-definition display devices. If an individual requests that a high-definition video be played, that video may be displayed by the high-definition display device. As another example, one or more display devices may be of a larger size than other display devices of a display array. In this particular scenario, if content is requested that requires a larger display device to properly be rendered, then the larger size display device may be used to display that content.

A display array may, in a non-limiting embodiment, include multiple display devices. An individual may arrange the display devices of the display array in any suitable manner, as described in greater detail below. In some embodiments, a display configuration of the various display devices of the display array may be stored by a computing system with which the individual has a user account. For example, an individual may have a registered user profile on the computing system, and a display configuration associated with the individual's display array may be stored by the computing system as being associated with the user profile. In this way, the computing system may store an arrangement of the display devices such that, if content is to be rendered, the computing system may dynamically monitor and allocate the content to one or more display devices. The display array, for instance, may be located within an individual's household environment, such as on one or more walls. The computing system may therefore store the display configuration of the display array in relation to one or more features of the household environment (e.g., a room size, acoustic levels, other devices located within the household environment that are also associated with the user profile, etc.). The computing system may also include, and/or be in communication with, a speech-processing system. This may enable an individual to utter questions/requests/commands to cause certain content to be rendered by one or more of the array's display devices.

In some embodiments, each display device may be capable of displaying a web view browser of an application supplying particular content. For example, a first display device associated with the display array may access a first application, such as a weather forecast or sports application, using a first uniform resource link ("URL"). The first URL, for instance, may allow the first display device to access an application specific server for generating, storing, updating, and providing content to one or more requesting devices. In some embodiments, an application programming interface ("API") may be used by the application specific server to build the various components of the content that may be accessed thereby.

The computing system may include, in a non-limiting embodiment, a device management system and an applications management system. Upon determining particular content to be displayed, the applications management system may access a particular application associated with that content. The applications management system may then communicate with the device management system to determine an availability of one or more display devices that form the display array. The device management system may inform the applications management system of which display devices are available to display content, and the computing system may generate and send the content, or a web browser accessible link (e.g., a URL) for accessing the content from the particular application, to one or more of the available display devices. If, for instance, only a single display device is needed for displaying content, then the URL may be sent to a particular display device that has been indicated as being available, such as a primary display device, or a display device assigned to display requested content. However, if multiple display devices are needed, the device management system may determine whether there are enough display devices available for the display array, and the computing system may accordingly send the URL to the available display devices (if possible).

In some embodiments, an individual may be able to interact with one or more of the display devices using a touch input. For example, content displayed on a particular display device may be scrolled through using a scroll gesture. A scroll gesture may correspond to a type of touch gesture that may be performed by an individual to a touch sensitive display screen. For example, a touch-based "scrolling" gesture may correspond to a touch input performed by an object, such as one or more fingers, on a touch sensitive display screen that causes text, images, and/or video to slide across the touch sensitive display screen, either vertically, horizontally, or in any other suitable direction. In general, a scrolling gesture may cause a text and/or image layout to remain unchanged, however the individual's view across an apparently larger image that may not be entirely seen, may move. Scrolling gestures may be performed in discrete increments (e.g., one or more lines of text or pixels displayed by the touch sensitive display screen may move), or continuously, for example. Another type of scrolling gesture may be referred to as a touch-based "swipe" gesture, for example, which may allow an individual to rapidly visually scan through displayed content by moving an object, such as their finger(s), in a substantially straight direction across the touch sensitive display device. For instance, an individual may perform a "swipe" gesture about a displayed image catalog to quickly view the images included therein. As still yet another example, and individual may perform a "dragging" gesture, which selects and moves a displayed item in response to an input, such as a tap or click, being performed on the displayed item and, while staying in contact with the displayed item on the display device, moving one's finger or mouse to a new location on the display device, where contact with the displayed item then ceases.

In some embodiments, the display array may include sound controlled functionality that enables an individual to control what content is being displayed by one or more display devices of the display array in response to detecting a particular sound or sounds. Therefore, in this particular instance, the multi-screen array may correspond to a type of sound controlled electronic device, or sound controlled system including multiple display devices. For example, a display array may be include one or more audio input components and/or audio output components, such that the display array is capable of being activated in response to detection of a specific sound (e.g., a word, a phoneme, a phrase or grouping of words, or any other type of sound, or any series of temporally related sounds). In some embodiments, the sound controlled functionality may correspond to voice activated functionality. In this particular instance, the display array may correspond to a voice activated device including multiple display devices. For example, in response to detecting a wakeword, the display array may be capable of generating and sending audio data representing an utterance to a speech-processing system.

Spoken voice commands, in some embodiments, may be prefaced by a wakeword, which may also be referred to as a trigger expression, wake expression, or activation word. In response to detecting that the wakeword was uttered, a voice activated device may be configured to detect and interpret any words that subsequently follow the wakeword as actionable inputs or commands. In some embodiments, the voice activated device may be activated by a phrase or grouping of words, which the voice activated device may also be configured to detect. The voice activated device, therefore, may also be able to detect and interpret any words subsequently following that phrase or grouping of words.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however persons of ordinary skill in the art will recognize that the any word (e.g., "Amazon" or "Hello"), or series of words (e.g., "Wake Up" or "Hello, Alexa") may alternatively be used as the wakeword. Furthermore, the wakeword may be set or programmed by an individual operating a voice activated device, and in some embodiments more than one wakeword (e.g., two or more different wakewords) may be available to activate a voice activated device. In yet another embodiment, the trigger that is used to activate a voice activated device may be any series of temporally related sounds.

As used herein, the term "utterance" may correspond to a spoken word, statement, or sound. In some embodiments, an utterance may include the wakeword followed by an invocation, such as a request, question, or command. In this particular instance, the utterance may begin with the wakeword being spoken, and may end when a last word, phoneme, or sound is spoken. For example, an utterance may correspond to the question, "Alexa—What is the weather currently like?" As another example, an utterance may be, "Alexa—Play my workout music." Further still, an utterance, which need not include the wakeword, may be, "Turn up the volume" or "Call mom."

A voice activated device, such as a display array including voice activated functionality, may monitor audio input data detected within its local environment using one or more microphones, transducers, or other audio input devices located on, or in communication with, the voice activated device. The voice activated device may, in some embodiments, then provide the audio data representing the detected audio input data to a speech-processing system for processing and analyzing the audio data, which may then generate and sent a response to the voice activated device, as well as, or alternatively, communicate with one or more additional computing systems for obtaining content to be rendered by the voice activated device. Additionally, the voice activated device may store one or more wakewords within its local memory. If a determination is made that audio data received from the audio input devices (e.g., microphones) matches the wakeword, the voice activated device may begin sending audio data representing some or all of the audio captured by the voice activated device to the speech-processing system.

In some embodiments, the trigger may be a non-verbal sound. For example, the sound of a door opening, an alarm going off, glass breaking, a telephone ringing, or any other sound may alternatively be used to activate a sound controlled device. In this particular scenario, detection of a non-verbal sound may occur in a substantially similar manner as that of a verbal wakeword for a voice activated device. For example, the sound of a door opening, when detected, may activate a sound activated device, which in turn may activate a burglar alarm.

In some embodiments, however, the display array may include manually activated functionality. For example, the display array may correspond to a manually activated device that includes multiple display devices. A manually activated device, as described herein, may correspond to a device that is capable of being activated in response to a manual input from an individual (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

As used herein, "content" may correspond to information consumable by an individual viewing one or more display devices that form a display array. For example, a display device may render sports content. An individual may be able to view the information pertaining to a particular sporting event or events by viewing the display device(s) and/or hearing audible information associated therewith. Display data and/or audio data may represent a particular type of content (e.g., videos, images, text, sound, etc.), in an illustrative embodiment. For example, display data representing content may be received by a display device. The display data may include instructions indicating a manner in which the display device is to render the content such that it is capable of being presented by the display device to an individual. As another example, display data representing content, such as a photograph or video may be received by a display device, and the display device may display the photograph or video thereon. The display data, for instance, may indicate which pixels of a display screen are to be configured to represent a particular portion of an image, series of images, and/or video, such that the content is able to be viewed using the display screen.

Figure 1B:
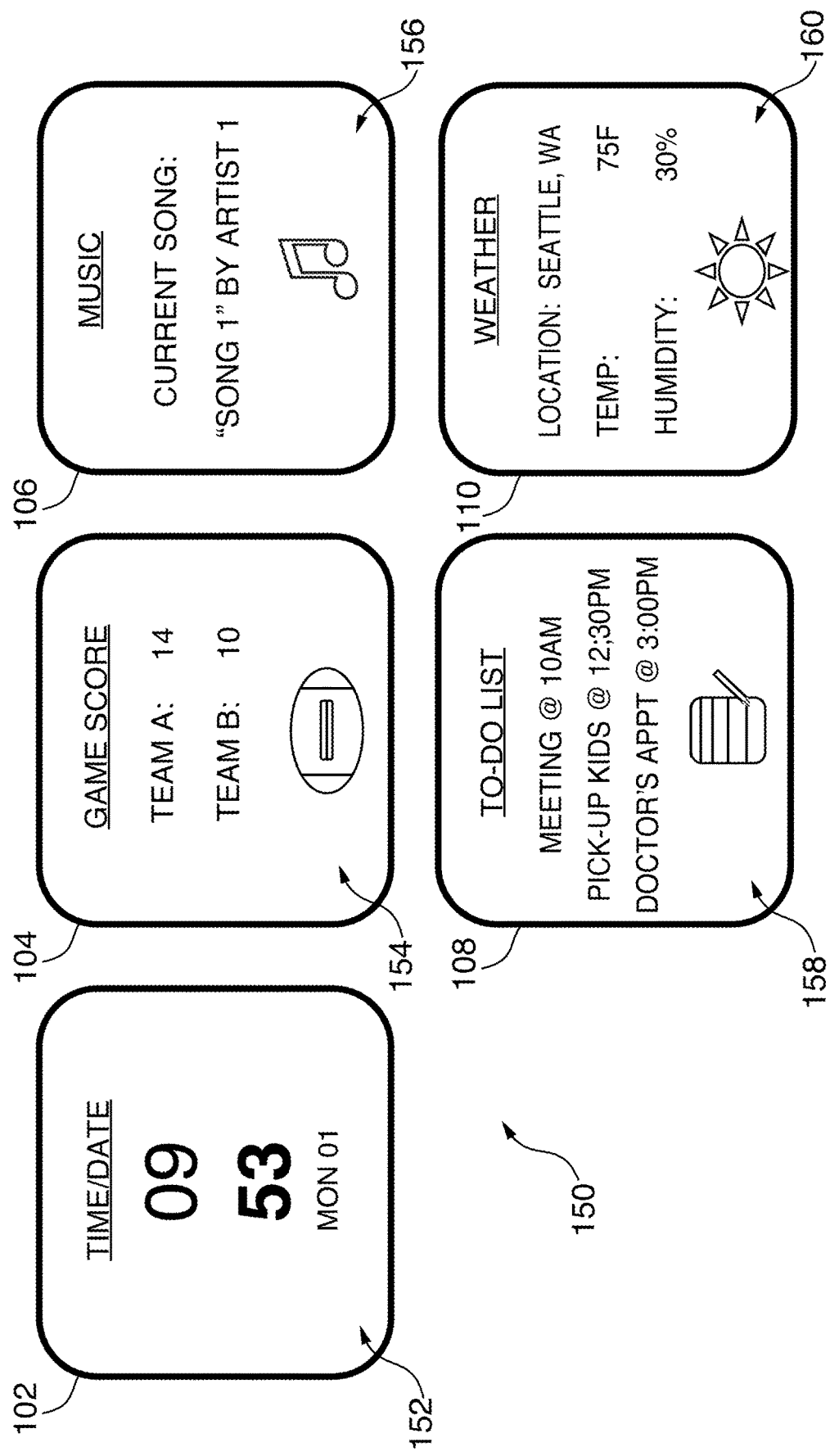

FIGS. 1A and 1B are illustrative diagrams of a display array for displaying content using various display devices, and displaying a new content associated with content displayed by the display array, respectively, in accordance with various embodiments. Display array 100, in the illustrative, non-limiting embodiment of FIG. 1A, may include a first display device 102, a second display device 104, a third display device 106, a fourth display device 108, and a fifth display device 110. Each of display devices 102, 104, 106, 108, and 110 may be substantially similar to one another (e.g., size, shape, resolution, usage, etc.), however this is merely exemplary. As will be described in greater detail below with reference to FIG. 2, display array 100 may be arranged in any suitable manner by an individual, and it is merely illustrative that display devices 102, 104, and 106 are arranged along a first horizontal row while display devices 108 and 110 are displayed along a second horizontal row below the first. Furthermore, display array 100 may be located within an individual's household. For example, display array 100 may be placed on a wall of a room. In some embodiments, however, one or more display devices of display array 100 may be located at different locations. For example, first display device 102 may be located in a first location (e.g., a wall in a living room), while second display device 104 may be located in a second location (e.g., a wall in a bedroom). In some embodiments, one or more of display devices 102-110 may be capable of displaying multiple instances of content. For example, display screen 102 may include one or more screen emulation features such that various types of content (e.g., weather, photos, music, etc.) are capable of being displayed at a same time using display screen 102.

Each of display devices 102-110 of display array 100 may be capable of displaying content. For instance, content from one or more applications (e.g., a weather application, a sports application, a photography application, a video application, etc.), data sources (e.g., memory), websites, and the like, may be displayed using one or more display devices. In one non-limiting embodiment, display array 100 may include one display device that is capable of serving as a reference display. The reference display, for instance, may continually display substantially similar content regardless of the content being displayed by any of the other display devices of display array 100. As an illustrative example, first display device 102 may be assigned as being the reference display device. However, persons of ordinary skill in the art will recognize that any display device, or display devices, of display array 100 may be assigned as being the reference display, and the use of first display device 102 as the reference display is merely illustrative. Furthermore, in some embodiments, display array 100 may not include any display device serving as a reference display.

Applications, such as a time/date application, music application, sports application, and the like, as described herein, may correspond to web applications. A web application may refer to one or more computer programs that allow an individual, using an Internet accessible device, to send and/or receive data to/from a database via the Internet. Web applications may, for instance, be customer centric, conforming to a particular user's credentials and preferences (e.g., an individual's login information, content information, and the like). In some embodiments, a content source (e.g., a weather source, sports source, etc.) may populate a database with their content using an application programming interface ("API") specific to that content source. The content source may then generate and build web sites, accessible using web browsers, that include content for that content source.

Data received from a web application may be rendered using a web browser. A web browser may be used to access a website having a unique address, which may be identified by a uniform resource locator ("URL") (e.g., www.websitename.com). Typically, to access a particular website, an individual may input the desired website's address into a web browser on their local device. The web browser may then allow the individual to access content from that website. Web applications may render a particular website's content to allow a web browser to view and interact with the content on their local client device. Data representing such content is typically generated using HTML or XHTML, and one or more client-side computer scripts, such as JavaScript or CSS, may be used by a client side device to read the generated content. The web browser, therefore, runs the local client side computer script and displays the content represented by the data from the web application. Each display device of display array 100 is capable of accessing one or more web applications and rendering content using their local client-side script. For example, each of display devices 102-110 may run a JavaScript client. When content is requested, or provided, the URL for that content is accessed, data representing the content is received by display devices 102-110, and the local client script renders the content for that particular display device or display devices.

In the illustrative embodiment, first display device 102 may display first content 112. First content 112 may correspond to a current time and/or date. In some embodiments, a time/date application stored on a remote computing system may send a first URL to first display device 102 such that first display device 102 is capable of displaying first content 112 thereon. First content 112 may, for instance, correspond to a web-view of the time/date application. First content 112, therefore, may be displayed by first display device 102 accessing the first URL for the time/date application, and then running a local client script to render the HTML data of the time/date application's content.

In some embodiments, as a time/date changes, the data representing first content 112 may also change, which may be reflected by first content 112. The data representing content 112 may, for instance, be HTML data, however persons of ordinary skill in the art will recognize that any suitable format may be used for data representing content for being displayed by a display device of display array 100. For example, display array 100, or in particular first display device 102, may automatically periodically (e.g., every few seconds) or manually communicate with the time/date application to see if any updates or changes to the data has occurred. As another example, display array 100, or first display device 102 in particular, may maintain a consistent feed from the time/date application such that any changes made by the server side time/date application, the local client script of first display device 102 may render the new content thereby. In other words, data representing first content 112 may be updated by pushing or pulling the data from the time/date application. If new data associated with first content 112 is received, or a notification is received indicating that new data has been received, then first display device 102 may render that new content upon receipt.

Second display device 104, in one embodiment, may display second content 114. Second content 114 may correspond to a graphic of an audio file (e.g., an MP3, MP4, .wav file, etc.) currently being played by an audio output component of display array 100 and/or in communication with display array 100. Second content 114, in some embodiments, may be associated with a music application stored by a remote computing system. For example, the remote computing system may include memory storing one or more audio files associated with a user account also linked to display array 100. As another example, the remote computing system may correspond to memory storing one or more files that may be streamed to one or more display devices of display array 100. As still yet another example, the remote computing system may access, or be in communication with, a music database that sores one or more music files thereon, which may be accessed by the remote computing system.

Second content 114 may indicate a current audio file that is being played, and may include a song title, artist name, album cover art, song elapsed time, song duration, and the like, associated with the current audio file. In some embodiments, second content 114 may correspond to a web-view of a music application. For instance, second display device 104 may use a second URL to access the music application, receive data representing second content 114, and may render second content 114 on second display device 104 using a local client script. As different songs play (e.g., requested by an individual, a next song in a playlist, etc.), the data representing second content 114 may also change. For example, a first song (e.g., "Song 1" by "Artist 1") may play using a speaker associated with display array 100 in response to receiving data representing content 114. Content 114, therefore, may include audio data representing the audio file of the first song, or data for accessing the song from a music service. Additionally, data representing content 114 may include a graphic indicating a name of the song currently being played, the artist name for that song, and a musical graphic, however persons of ordinary skill in the art will recognize that more or less content may be included. As another example, in the illustrated embodiment, "Song 1" by "Artist 1" may currently be playing. After "Song 1" finishes, "Song 2" by "Artist 2" may play. Thus, in this example, second content 114 may also be modified to display graphics associated with the new song (e.g., "Song 2") and/or the new artist (e.g., "Artist 2"), which may be received from the music application.

Third display device 106, in one embodiment, may display third content 116. Third content 116, for example, may correspond to a sports score of a game between two teams, Team A and Team B. An icon indicating a type of sport being played (e.g., football, baseball, golf, basketball, hockey, etc.) may also be displayed by third display device 106 via third content 116. In some embodiments, data representing third content 116 may be accessed by third display device 106. For instance, a third URL associated with a sports application may be accessed to receive data representing third content 116. An individual may seek to view the score a particular game, and may use display device 106 to access a sports application capable of providing updated information associated with that game. When an update to the score of the game occurs, the data associated with the URL for the sports application may change, and therefore third content 116 may also change. For instance, data representing third content 116 may change, and therefore the data may now represent different, updated content.

Fourth display device 108, in one embodiment, may display fourth content 118. Fourth content 118, for instance, may correspond to a list feature including a listing of items customizable for a particular individual operating, and/or associated with, display array 100. Each item of the list, for example, may be displayed by fourth display device 108. If an item is added to the list, or removed from the list, data representing content 118 rendered by fourth display device 108 may also change. In some embodiments, a list application may be accessed using a fourth URL, such that data representing content 118 may be rendered using a local client script of fourth display device 108 to display fourth content 118.

Fifth display device 110, in the illustrative embodiment, may display fifth content 120. Fifth content 120, for example, may be associated with a weather forecast, and may indicate a current temperature, humidity, and the like for a particular location. The location(s) that may be used for displaying fifth content 120 may be set by an individual, or requested. For example, and individual may speak an utterance, "Alexa—What is the weather like in Seattle?" In response, a computing system capable of accessing data representing weather content from a weather application may send a URL for the weather application to fifth display device 110, which in turn may access the data associated with the weather application to display fifth content 120 thereon.

Persons of ordinary skill in the art will recognize that although five display devices are included within display array 100, any number of display devices may be employed, and the aforementioned is merely exemplary. Furthermore, the various types of content (e.g., time/date, music, sports, list, weather) are merely illustrative. Persons of ordinary skill in the art will recognize that data representing any suitable content may be accessed, and the content displayed, by any of the display devices of display array 100 including, but not limited to, sports, news, lists, music, weather, banking, games, email, directions (e.g., maps), telephone services, messaging services, social media services, and images/videos.

In the illustrative, non-limiting embodiment of FIG. 1B, display array 100 may display an update to third content 116 of FIG. 1A. For example, a score of the game that was being displayed by third content 116 within third display device 106 may have changed. The sports application sent data representing third content 116 may send a notification to display device 106 that indicates that third content 116 has changed, and that the data representing third content 116 is to rendered again. Alternatively, however, device 106 may determine that the data received from the sports application has changed, and therefore may itself determine that the content is to be rendered again. For example, data representing an update to, or a new portion of, third content 116 (e.g., HTML data) has been received. In response, an applications management system located on a remote computing device may determine which display device of array 100 is to be used to display the new content.

In some embodiments, the computing system may have a predefined prioritization relationship stored for display array 100. The prioritization relationship, in a non-limiting embodiment, may indicate which display device of display array 100 should be used to display content of varying priority levels. For example, the prioritization relationship may indicate that display device 104 is to be used for displaying higher priority content than display device 106, which may be used for displaying higher priority content than display device 108, which may be used to be used for displaying higher priority content than display device 110, which may be used for displaying a lowest priority content. In this particular instance, display device 102 may be assigned as being used as a reference display, and may therefore not change what content it is currently displaying. Persons of ordinary skill in the art will recognize that any display device of display array 100 may be assigned to display content having any particular priority level, and the aforementioned is merely exemplary.

In some embodiments, the computing system may include an applications management system for determining a priority level of different content being rendered by display array 100. For instance, some types of content that may be higher priority include, but are not limited to, new content, updates to currently displayed content, content associated with a recently used application or applications, and the like. The applications management system may, therefore, cause certain content to be sent to different display devices of display array 100 based on a priority level of the content as well as the prioritization relationship of the display devices.

In response to receiving a notification indicating that third content 116 of FIG. 1A has been updated, the applications management system may communicate with a device management system to determine which display devices of display array 100 to use to display the new, updated, version of third content 116, third content 154. In one embodiment, the device management system may indicate that first display device 102 is to continue displaying the same content, as it may have been assigned as being a reference display, while second display device 104 is to be used to display higher priority content. For example, third content 154, which corresponds to an update to content 116 previously displayed by display device 106, may now be of higher priority than content 114, 118, and 120. In some embodiments, the device management system may store a prioritization relationship of display array 100, which may indicate which display device to use for displaying higher priority content. As an illustrative example, second display device 104 may be assigned to display high priority content, such as an update to content currently being displayed by one or more display devices of display array 100.

Furthermore, because content 154 is now displayed using second display device 104, each display device of display array 100 may be caused to display different content. In some embodiments, the content rendered by each display device may be "downgraded" in priority level based on certain content being designated higher priority. For example, third display device 106 may now display content 156, which is associated with the music application. Previously, as seen within FIG. 1A, content 114 associated with the music application was displayed using second display device 104. However, because content 154 was determined to have a higher priority level, as it corresponds to updated content, display device 104 now displays content 154, and content 156 is caused to be displayed using a next most prominent display device, which in the illustrative example corresponds to third display device 106.

In some embodiments, display array 100 may have a descending scale of priority. For example, the device management system may store a prioritization relationship for display devices 102-110 that indicates that first display device 102 is to be used as the reference display, second display device 104 is to be used to display a highest priority content, third display device 106 is to be used to display next-highest priority content, fourth display device 108 is to be used to display a subsequent highest priority content, and fifth display device 110 is to be used to display a lowest priority content. In this way, display array 100 may dynamically manage and allocate display devices 102-110 for rendering content based on the priority level of the content, and the prioritization relationship of the display devices of display array 100. For instance, an update to currently displayed content, a request for different content to be displayed, or new content that is received may be displayed using a particular display device. However, although the aforementioned indicates that display device 102 is used as a reference display, and display devices 104-110 are used to display content in descending priority, persons of ordinary skill in the art will recognize that this is merely exemplary, and any display device may be used to display any suitable priority content.

Figure 2:
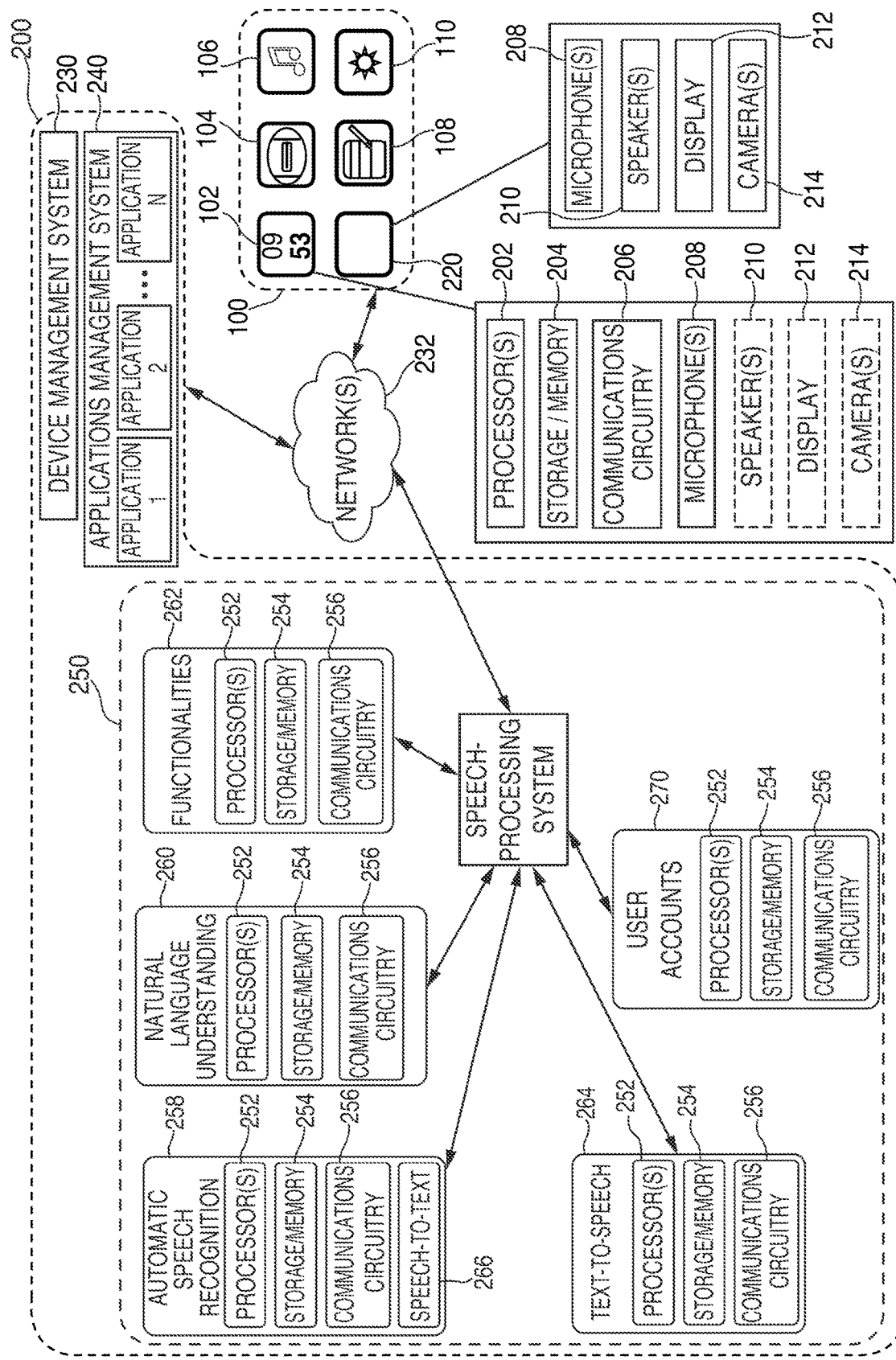
FIG. 2 is an illustrative diagram of a system architecture for an exemplary display array include one or more display devices, and a computing system with which the display array may communicate with, in accordance with various embodiments.

FIG. 2 is an illustrative diagram of a system architecture for an exemplary display array include one or more display devices, and a computing system with which the display array may communicate with, in accordance with various embodiments. Display array 100, in some embodiments, may include display devices 102, 104, 106, 108, and 110. Furthermore, in some embodiments, display array 100 may include sound controlled functionality, such as one or more voice activated components, as well as, or alternatively, one or more manually activated components for manually controlled functionality. In some embodiments, display array 100 may be configured such that it may communicate with a computing system 200, which may include a speech-processing system 250, in response to detecting an utterance including a wakeword, which may subsequently be followed by a request/question/statement. Similarly, display array 100 may also be configured, in one embodiment, to communicate with computing system 200 in response to a manual input being detected by one or more input mechanisms, such as a touch screen, a button, and/or a switch, for example.

In a non-limiting embodiment, display array 100 may be capable of being activated in response to detecting a specific sound, such as a wakeword, as well as, or alternatively, via one or more inputs. After detecting a specific sound (e.g., a wakeword or trigger expression), display array 100 may recognize commands (e.g., audible commands, inputs) within captured audio, and may perform one or more actions in response to the received commands. Furthermore, display array 100 may also be configured to perform one or more actions in response to detecting a particular touch, or mechanical, input(s) via one or more of display devices 102-110.

Each of display devices 102-110 may correspond to any suitable type of electronic device including, but are not limited to, desktop computers, mobile computers (e.g., laptops, ultrabooks), mobile phones, smart phones, tablets, televisions, set top boxes, smart televisions, watches, bracelets, display devices, personal digital assistants ("PDAs"), smart furniture, smart household devices, smart vehicles, smart transportation devices, and/or smart accessories. In some embodiments, display devices 102-110 of display array 100 may be relatively simple or basic in structure such that no, or a minimal number of, mechanical input option(s) (e.g., keyboard, mouse, track pad) or touch input(s) (e.g., touch screen, buttons) are included. For example, display device 102 may be able to receive and output audio, and may include power, processing capabilities, storage/memory capabilities, and communication capabilities. However, in other embodiments, display device 102 may include one or more components for receiving mechanical inputs or touch inputs, such as a touch screen and/or one or more buttons.

Display devices 102-110, in one embodiment, may include a minimal number of input mechanisms, such as a power on/off switch such that functionality of display devices 102-110 may solely be through audio input and audio output. For example, one or more of display devices 102-110, or a separate microphone component of display array 100, may listen for a wakeword by continually monitoring local audio. In response to the wakeword being detected, display array 100 may establish a connection with computing system 200, send audio data to speech-processing system 250 of computing system 200, and await/receive a response from speech-processing system 250. In some embodiments, however, non-voice activated devices may also communicate with speech-processing system 250 of computing system 200 (e.g., push-to-talk devices). For example, in response to a button or touch screen being pressed, or a button or touch screen being pressed and held, a microphone associated with display array 100 may begin recording local audio, and may establish a connection with computing system 200, send audio data representing the captured audio to speech-processing system 250, and await/receive a response from speech-processing system 250.

Each of display devices 102-110 may include one or more processors 202, storage/memory 204, and communications circuitry 206. In some embodiments, display devices 102-110 may also, optionally, include one or more microphones 208 or other audio input devices (e.g., transducers), one or more speakers 210 or other audio output devices, a display 212, and/or one or more cameras 214 or other image capturing components. However, one or more additional components may be included within display devices 102-110, and/or one or more components may be omitted. For example, display devices 102-110 may also include a power supply or a bus connector. As still yet another example, display devices 102-110 may include one or more additional input and/or output mechanisms, such as one or more buttons, or one or more switches or knobs. Furthermore, while multiple instances of one or more components may be included within display devices 102-110, for simplicity only one of each component has been shown.

In some embodiments, display devices 102-110 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In one embodiment, display array 100 may include an additional device 220, which may include microphone(s) 208, speaker(s) 210, display 212, and/or camera(s) 214. Additionally, additional device 220 may also include one or more instances of processor(s) 202, storage/memory 204, and communications circuitry 206, however one or more of any of the aforementioned components may be omitted. For example, additional device 220 may correspond to a centralized control device of display array 200 that includes one or more microphone(s) 208 and/or speaker(s) 210. Microphone(s) 208 may receive audio input signals, which in turn may be sent to speech-processing system 250 in response to a wakeword engine of display array 100 determining that a wakeword was uttered. Similarly, speaker(s) 210 may be used to output audio data associated with content displayed by display devices 102-110. Still further, one or more of processor(s) 202, storage/memory 204, communications circuitry 206, microphone(s) 208, and/or speaker(s) 210 may be housed external to display array 100 such that they may be in communication with display array 100, albeit not specifically part of display array 100. As described herein, each of processor(s) 202, storage/memory 204, communications circuitry 206, microphone(s) 208, and/or speaker(s) 210 may be considered as a component unique to each display device 102-110, unique to display array 100, and/or in communication with display array 100.

Processor(s) 202 may include any suitable processing circuitry capable of controlling operations and functionality of display array 100, as well as facilitating communications between various components within display array 100 and/or display devices 102-110. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program modules, program data, and/or one or more operating systems. However, processor(s) 202 may run an operating system ("OS") for display devices 102-110, and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by one or more of display devices 102-110.

Storage/memory 204 may include one or more types of storage mediums such as any volatile or non-volatile memory, or any removable or non-removable memory implemented in any suitable manner to store data on display devices 102-110 and/or for display array 100. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include one or more modules and/or databases, such as a speech recognition module, a wakeword database, a sound profile database, and a wakeword detection module. The speech recognition module may, for example, include an automatic speech recognition ("ASR") component that recognizes human speech in detected audio. The speech recognition module may also include a natural language understanding ("NLU") component that determines user intent based on the detected audio. Also included within the speech recognition module may be a text-to-speech ("TTS") component capable of converting text to speech to be outputted by speaker(s) 210, and/or a speech-to-text ("STT") component capable of converting received audio signals into text to be sent to speech-processing system 250 for processing.

The wakeword database may be a database stored locally on one or more of display devices 102-110, or by memory of display array 100, and may include a list of a current wakeword for display array 100, as well as one or more previously used, or alternative, wakewords for voice activated electronic device. In some embodiments, an individual may set or program a wakeword for their display array 100. The wakeword may be programmed directly on display devices 102-110, or a wakeword or words may be set by the individual via a local client application that is in communication with speech-processing system 250 of computing system 200. For example, an individual may use their mobile device having the speech-processing system application running thereon to set the wakeword. The specific wakeword may then be communicated from the mobile device to speech-processing system 250, which in turn may send/notify display array 100 of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on display devices 102-110 and/or display array 100. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection module may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMI model represents a word as a series of states. Generally, a portion of an audio signal is analyzed by comparing its HMI model to an HMM model of the trigger expression, yielding a feature score that represents the similarity of the audio signal model to the trigger expression model.

In practice, an HMM recognizer may produce multiple feature scores, corresponding to different features of the HMI models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, display array 100 may then begin transmitting the audio signal to speech-processing system 250 of computing system 200 for detecting and responds to subsequent utterances made by an individual.

Communications circuitry 206 may include any circuitry allowing or enabling display devices 102-110 to communicate with one another, one or more additional devices, servers, and/or systems. For example, communications circuitry 206 may facilitate communications between display devices 102-110 and/or computing system 200. As an illustrative example, audio data representing an utterance may be transmitted over a network 232 such as the Internet, to speech-processing system 250 of computing system 200 using any number of communications protocols. For example, network(s) 232 may be accessed using Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between display array 100 and computing system 200. In some embodiments, display array 100, display devices 102-110, and computing system 200 may communicate with one another via a web browser using HTTP. Various additional communication protocols may be used to facilitate communications between display array 100 (e.g., one or more of display devices 102-110) and computing system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, display array 100, and/or display devices 102-110, may include an antenna to facilitate wireless communications with a network using various wireless technologies (e.g., Wi-Fi, Bluetooth, radiofrequency, etc.). In yet another embodiment, display devices 102-110 may include one or more universal serial bus ("USB") ports, one or more Ethernet or broadband ports, and/or any other type of hardwire access port so that communications circuitry 206 allows display devices 102-110 to communicate with one or more communications networks.

Display devices 102-110 may also include one or more microphones 208 and/or transducers. Furthermore, display array 100 may include one or more microphones within additional device 220. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, display devices 102-110 may include multiple microphones (e.g., four, seven, ten, etc.) placed at various positions about display devices 102-110 to monitor/capture any audio outputted in the environment where display devices 102-110 is located. The various microphones 208 may include some microphones optimized for distant sounds, while some microphones may be optimized for sounds occurring within a close range of display array 100. In some embodiments, microphone(s) 208 may only begin to detect audio signals in response to a manual input to display devices 102-110. For example, a manually activated device may begin to capture audio data using microphone(s) 208 in response to a user input, such as pressing a button, tapping a touch screen, or providing any touch input gesture to a touch input component.

Display devices 102-110 may further include one or more speakers 210. Furthermore, additional device 220 of display array 100 may include one or more speaker(s) 210. Speaker(s) 210 may correspond to any suitable mechanism for outputting audio signals. For example, speaker(s) 210 may include one or more speaker units, transducers, arrays of speakers, and/or arrays of transducers that may be capable of broadcasting audio signals and or audio content to a surrounding area where display array 100 may be located. In some embodiments, speaker(s) 210 may include headphones or ear buds, which may be wirelessly wired, or hard-wired, to one or more display devices 102-110, that may be capable of broadcasting audio directly to an individual.

In some embodiments, one or more microphones 208 may serve as input devices to receive audio inputs. Display devices 102-110, in the previously mentioned embodiment, may then also include one or more speakers 210 to output audible responses. In this manner, display devices 102-110 may function solely through speech or audio, without the use or need for any input mechanisms or displays, however this is merely exemplary.

Display 212 may correspond to a display device and/or touch screen, which may be any size and/or shape and may be located at any portion of display devices 102-110. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display 212 may correspond to a projected capacitive touch ("PCT"), screen include one or more row traces and/or driving line traces, as well as one or more column traces and/or sensing lines.

Display 212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display 212, a capacitance between the object and the conductive material may be formed. Processor(s) 202 may be capable of determining a location of the touch screen associated with where the capacitance change is detected, and may register a touch input as occurring at that location.

In some embodiments, display 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display 212 corresponding to where a conductive object contacted display 212.

A change in capacitance may be measured to determine a location on the touch screen where the object has contacted the surface. For example, if an individual touches a point on display 212, then a corresponding driving line and sensing line that intersect at that point may be identified. A location of the point may have one or more pixels associated with that location, and therefore one or more actions may be registered for an item or items that are displayed at that location. Processor(s) 202 of display devices 102-110 may be configured to determine which pixels are associated with a particular location point, and which item or items are also displayed at that pixel location. Furthermore, display devices 102-110 may be configured to cause one or more additional actions to occur to the item or items being displayed on display 212 based on a temporal duration the touch input, and or if one or more additional touch inputs are detected. For example, an object that contacted display 212 at a first location may be determined, at a later point in time, to contact display 212 at a second location. In the illustrative example, an object may have initially contacted display 212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display 212 having 100 driving lines and 100 sensing lines may have 100 intersection points, and therefore 100 individual capacitors, while a touch screen display 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by display devices 102-110, and therefore the fewer driving lines and/or sensing lines used, the smaller the amount of power that is needed to operate the touch screen display.

In some embodiments, display 212 may correspond to a high-definition ("HD") display. For example, display 212 may display images and/or videos of 720p, 1080p, 1080i, or any other image resolution. In these particular scenarios, display 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 by 1080 image having 2,073,600 pixels. However, persons of ordinary skill in the art will recognize that the aforementioned display ratios and pixel numbers are merely exemplary, and any suitable display resolution or pixel number may be employed for display 212, such as non-HD displays, 4K displays, and/or ultra displays.

In some embodiments, display devices 102-110 and/or display array 100 may include one or more cameras 214, corresponding to any suitable image capturing component or components capable of capturing one or more images and/or videos. Camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, display devices 102-110 and/or display array 100 may include multiple cameras 214, such as one or more front-facing cameras and/or one or more rear facing cameras. Furthermore, camera(s) 214 may be configured to recognize far-field imagery (e.g., objects located at a large distance away from display devices 102-110) or near-filed imagery (e.g., objected located at a relatively small distance from display devices 102-110). In some embodiments, camera(s) 214 may be high-definition ("HD") cameras, capable of obtaining images and/or videos at a substantially large resolution (e.g., 726p, 1080p, 1080i, etc.). In some embodiments, camera(s) 214 may be external to display devices 102-110. For instance, an external camera may be capable of capturing images and/or video, which may then be provided to display devices 102-110 for viewing and/or processing.

In one exemplary embodiment, display devices 102-110 and/or display array 100 may include an additional input/output ("I/O") interface. For example, display devices 102-110 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of display devices 102-110 may include one or more lights, light emitting diodes ("LEDs"), or other visual indicator(s).

Persons of ordinary skill in the art will recognize that, in some embodiments, one or more features of the output portion of the I/O interface may be included in a purely voice activated version of display devices 102-110. For example, one or more LED lights may be included on display devices 102-110 such that, when microphone(s) 208 receive audio, the one or more LED lights become illuminated signifying that audio has been received by display devices 102-110. In some embodiments, one or more vibrating mechanisms or other haptic features may be included with display devices 102-110 to provide a haptic response to an individual.

In some embodiments, display array 100 may include additional device 220 that includes one or more of microphone(s) 208, speaker(s) 210, display 212, camera(s) 214, as well as one or more of processor(s) 202, storage/memory 204, and communications circuitry 206. For example, additional device 220 may be included within display array 100 such that it facilitates communications from computing system 200 and one or more of display devices 102-110. In response to receiving audio data representing an utterance, or detecting a touch input on one of display devices 102-110, additional device 220 may send the audio data or touch input indication data to computing system 200. For example, additional device 220 may include microphone(s) 208 thereon. In response to detecting a wakeword, the additional processing device may send audio data representing an utterance to speech-processing system 250 of computing system 200 using network(s) 230.

Computing system 200, in one non-limiting, example embodiment, may include speech-processing system 250. Speech-processing system 250 may, in some embodiments, include one or more remote devices capable of receiving and sending content from/to one or more electronic device, such as display array 100 and/or display devices 102-110 of display array 100. Speech-processing system 250 may include various components and modules including, but not limited to, automatic speech recognition ("ASR") module 258, natural language understanding ("NLU") module 260, functionalities module 262, text-to-speech ("TTS") module 264, and user accounts module 270. In some embodiments, speech-processing system 250 may also include computer readable media, including, but not limited to, flash memory, random access memory ("RAM"), and/or read-only memory ("ROM"). Speech-processing system 250 may also include various modules that store software, hardware, logic, instructions, and/or commands for speech-processing system 250, such as a speaker identification ("ID") module, or any other module, or any combination thereof.

ASR module 258 may be configured to recognize human speech in detected audio, such as audio captured by microphone(s) 208, which may then be transmitted to speech-processing system 250. ASR module 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. In some embodiments, ASR module 258 may include speech-to-text ("STT") module 266. STT module 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR module 258 may include an expression detector that analyzes audio signals received by speech-processing system 250, such as the expression detector mentioned above with regards to display array 100. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword or phrase, is represented within the audio signal. The expression detector may then compare that score to a threshold value to determine whether the wakeword or phrase will be declared as having been spoken.

NLU module 260 may be configured such that it determines user intent based on the received audio data. For example, NLU module 260 may determine that the intent of command 4 is for traffic information. In response to determining the intent of command 4, NLU module 260 may communicate the received command to an appropriate subject matter server or skill on functionalities module 262 to perform one or more tasks, and/or retrieve an appropriate response or response information. NLU module 260 may include processor(s) 252, storage/memory 254, and communications circuitry 256 which, in one embodiment, may be substantially similar to processor(s) 202, storage/memory 204, and communications circuitry 206 of electronic device 200, and the previous description may apply.

Functionalities module 262 may, for example, correspond to various action specific systems or servers, sometimes referred to as "skills," capable of processing various task specific actions. Functionalities module 262 may further correspond to first party applications and/or third party applications capable of performing various tasks or actions. For example, based on the context of the audio received from display array 100, speech-processing system 250 may use a certain functionality to generate a response, or to obtain response information, which in turn may be communicated back to display array 100. For instance, an utterance may ask for traffic information, and therefore functionalities module 262 may access a traffic subject matter server to obtain current traffic patterns and traffic information for a location associated with display array 100. Functionalities module 262 may also include processor(s) 252, storage/memory 254, and communications circuitry 256.

TTS module 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS module 264 may also include processor(s) 252, storage/memory 254, and communications circuitry 256.

User accounts module 270 may store one or more user profiles corresponding to users having a registered account on computing system 200. For example, a parent may have a registered account on computing system 200, and each of the parent's children may have their own user profile registered under the parent's registered account. Information, settings, and/or preferences, for example, for each user profile may be stored within a user profile database. In some embodiments, user accounts module 270 may store a voice signal, such as voice biometric information, for a specific user profile. This may allow speaker identification techniques to be used to match a voice to voice biometric data associated with a specific user profile. In some embodiments, user accounts module 270 may store a telephone number assigned to a particular user profile.

Persons of ordinary skill in the art will recognize that although each of ASR module 258, NLU module 260, subject matter/skills module 262, TTS module 264, user accounts module 270, sound profile database 270, and sound profile generation module 272 may each include instances of processor(s) 252, storage/memory 254, and communications circuitry 256, and those instances of processor(s) 252, storage/memory 254, and communications circuitry 256 within each of ASR module 258, NLU module 260, functionalities module 262, TTS module 264, user accounts module 270, sound profile database 270, and sound profile generation module 272 may differ. For example, the structure, functionality, and style of processor(s) 252 within ASR module 258 may be substantially similar to the structure, functionality, and style of processor(s) 252 within NLU module 260, however the actual processor(s) 252 need not be the same entity.

User accounts module 270 may also store a display configuration of display devices 102-110 of display array 100. The display configuration may be determined, in some embodiments, by a device management system 230 of computing system 200. In some embodiments, device management system 230 may include a configuration engine, an output module, a user-profile data store, and a content data store. The configuration engine, in a non-limiting embodiment, may receive an image of display array 100 and determine the constituency and layout of display devices 102-110 included therein. The output module, meanwhile, may function to output content for display devices 102-110 and/or be in communication with an applications management system 240 of computing system 200 to configure content to be output by display devices 102-110 after being configured. With the information regarding the constituency and layout of display array 100, applications management system 240 and device management system 230 may be able to more intelligently cause different types of content to be output by different display devices of display array 100.

To configure the display devices 102-110 of multi-device array 220, device management system 230 may include a configuration engine that may initially receive a configuration request from an individual's user device via a computing system application resident on the user device (e.g., a smartphone, tablet, etc.). In some embodiments, the configuration request may be received from one or more of display devices 102-110. In response to receiving the request, device management system 230 may use identifying information accompanying the configuration request to determine a user profile stored by user accounts module 270 that is associated with the particular user profile for that user device that the configuration request was received from. For instance, an individual may have signed in with (i.e., authenticated with) the computing system application on display device 102 before sending the configuration request, enabling device management system 230 to map the request a particular user profile within user accounts module 270. In other instances, device management system 230 may identify a particular user profile via an identifier of display array 100, a username associated with an individual operating display array 100, or any other identifying information, or any combination thereof.

After receiving the configuration request and identifying the user profile corresponding to the individual operating display array 100, device management system 230 may determine, from the user profile, one or more devices that are associated with that user profile. In some embodiments, devices associated with the user profile may include devices directly purchased or obtained by that individual (e.g., as stored within a purchase history for the user profile by user accounts module 270), as well as those devices purchased or obtained by other individuals associated with a particular household environment. For instance, if multiple users (e.g., husband, wife, children, etc.) have user profiles that are associated with a common address corresponding to a household, then each device associated with these profiles may be determined to be associated with the user profile of the individual. In other words, each time the individual or another individual associated with the environment acquires a device, that individual may associate that device with that individual's user profile stored by user accounts module 270. Therefore, when device management system 230 receives the configuration request, each device (e.g., display devices 102-110) associated with the particular user profile may be identified. After doing so, device management system 230 may send an instruction to each display device of display array 100 to present respectively unique visual indicia on display 212 for each of display devices 102-110. For instance, device management system 230 may send a first instruction to first display device 102 to present first visual indicia (e.g., a number "1"), a second instruction to second display device 104 to present a second visual indicia (e.g., a number "2"), and so forth. As described above, the visual indicia may comprise alphanumeric strings, identifiers previously associated with the devices (e.g., MAC addresses, etc.), patterns, objects, colored borders, or the like. In other instances, meanwhile, an individual may adhere identifiers to the devices (e.g., barcodes) or the like.

After display devices 102-110 display their unique visual indicia, device management system 230 may cause the computing system application to instruct the individual to capture an image of display array 100, which is then provided to device management system 230. In response to receiving the image, device management system 230 then performs image recognition on the image to identify any of the visual indicia depicted therein. After identifying the visual indicia in the image, device management system 230 may associate (or "map") these visual indicia with the respective display devices (e.g., display devices 102-110). In this example, device management system 230 may determine that display array 100 includes five display devices: first display device 102, second display device 104, third display device 106, fourth display device 108, and fifth display device 110. Device management system 230 may then store, in association with the user profile stored by user accounts module 270 for the requesting individual, an indication of a display configuration of display array 100 and display devices 102-110 included therein. Persons of ordinary skill in the art will also recognize that although five display devices are included within the illustrated embodiment, any number of display devices may be included, and furthermore one or more additional processing devices (e.g., a controller, speakers, microphones, voice activated components, manually activated components, etc.) may also be included and mapped using the aforementioned process.

In some embodiments, device management system 230 may utilize various image-recognition techniques to determine additional information associated with one or more of display devices 102-110 of display array 100. For instance, one or more capabilities of each display device (e.g., display visual content, output audible content, generate audio signals, generate video signals, etc.), a size of each display device, a position of each display device (e.g., within a local environment), and the like may be determined. In some instances, a position of each display device relative to one another may be determined, and the positional information may be indicating a layout of display devices 102-110 of display array 100 may be stored for the user profile, as well as any other user profiles, associated with the household environment where display array 100 is located. Further, device management system 230 may utilize known geometries and sizes to identify any combinations of multiple display devices that may be used as a single display device.

In some embodiments, device management system 230 may further store a prioritization relationship associated with the various display devices 102-110 of display array 100, which are associated with a particular user account. The prioritization relationship may indicate which display devices of display array 100 are assigned to display content of varying priority levels. For example, display device 104 may be assigned to display content having a highest priority level, while display device 110 may be assigned to display content having a lowest priority level. The prioritization relationship may be set by an individual using their computing system application, or directly using display devices 102-110. In some embodiments, the prioritization relationship may be based on the display configuration. For example, an upper-left most display device may be assigned to display high priority content, while a lower-right display device may be assigned to display low priority content. This may enable display devices 102-110 to logically display content in a form to be read, or viewed, left to right, however this is merely exemplary.

In some embodiments, device management system 230 may also track, monitor, and/or store information associated with one or more additional devices with which display array 100 may harness in order to perform one or more functions. For example, an additional speaker device external to display array 100 may be employed to output audio, such as audio associated with content displayed by display array 100. The additional speaker device may have a device identifier (e.g., device identification number, name, and/or symbol), which may be stored by user accounts module 270, and communicated to device management system 230 for use when identifying how particular content is to be rendered for a particular user profile. Similarly, an external microphone, or any other type of device, may be used in conjunction with display array 100, and its identifier may be stored as being associated with a same user profile as display array 100. In some embodiments, user accounts module 270 may further store a positional relationship between each device of display array 100, and any other devices associated with a same user profile.

In response to receiving a request to output content, applications management system 240 may communicate with device management system 230 to determine how to utilize display devices 102-110 of display array 100. For instance, applications management system 240 may indicate to device management system 230 that the requested content includes visual content requiring two display devices.

Device management system 230 may then access the configuration of display array 100 associated with the particular user profile stored by user accounts module 270 to determine how to utilize the various display devices of display array 100 to output the requested content. For example, applications management system 240 may instruct device management system 230 that certain content requires four display devices arranged in a square to be properly displayed. Device management system 230 then, in conjunction with a particular configuration of display devices for display array 100, determines that display devices 104-110 may be used to display content of that display format. In turn, device management system 230 informs applications management system 240 that displays 104-110 may be used to display the requested content, and applications management system 240 may, therefore, generate and/or send a URL to access a web application having the requested content to each of display devices 104, 106, 108, and 110. Furthermore, in some embodiments, device management system 230 may also instruct/inform applications management system 240 of which display device to use to display each portion of the requested content. For example, display device 104 may be used to display an upper right portion of the content, display device 106 may be used to display an upper left portion of the content, and so on. Similarly, computing system 200, may utilize the cameras, speakers, microphones, and the like as needed.

Applications management system 240, in some embodiments, may dynamically manage a list of the current active application or applications being used by display array 100. For instance, applications management system 240 may include website address, or content access mechanisms, for each application being used for rendering content by any of display devices 102-110.

In some embodiments, device management system 230 may include one or more processors, memory, and communications circuitry, and may be capable of determining and/or accessing a constituency and layout of display devices 102-110 of display array 100 associated with a user profile of user accounts module 270. Device management system 230 may indicate one or more display devices that are associated with the respective user profile, a group that each of the display devices is associated with, respective coordinates of each of the display devices with respect to the local environment where display array 100 is located, a respective protocol used to communicate with display array 100, and other user profiles that are also associated with display array 100.

Device management system 230 may, in some embodiment, store a layout of each of display devices 102-110 of display array 100 in addition to the layout being stored with a particular user profile within user accounts module 270. In one embodiment, device management system 230 stores coordinates of each display device within display array 100. To do so, in one example, a top-left corner of a display device of display array 100 that is furthest to the left side of the group may be deemed (0, 0) in an X-Y coordinate system (e.g., display device 102). When device management system 230 determines the size of that display device, it may store an indication of other coordinates (relative to the defined coordinate system) that the display device occupies as part of display array 100. As an illustrative example, first display device 102 may be determined to occupy a top-left most position within display array 100. Thus, the top left corner of display device 102 may be given the (0, 0) coordinate, and each of display devices 104-110 may be have their positioned determined in relation to that coordinate. However, persons of ordinary skill in the art will recognize that any display device, and any position of a display device, may be used as an origin for a coordinate system for display array 100, and the aforementioned is merely exemplary.

Device management system 230 may, in one embodiment, stores one or more communication protocols that may be used to communicate with each of display devices 102-110. The communication protocols may include IP-based protocols, short-range wireless communication protocols (e.g., Bluetooth, Zigbee, etc.) or the like. Device management system 230 may, therefore, reference these indications to determine how to send instructions to each display device of display array 100.

In one exemplary embodiment, device management system 230 and applications management system 240 may be a same component. For instance, a single computing device may include one component performing the functionalities of device management system 230, while another component may perform the functionalities of applications management system 240. In still yet another embodiment, some or all of computing system 200 (e.g., speech-processing system 250, device management system 230, and/or applications management system 240) may be separate from the other components. For example, device management system 230 and/or applications management system 240 may be housed by a computing device located within an individual's residence or workplace, whereas speech-processing system 250 may be housed at a remote computing facility. However, persons of ordinary skill in the art will recognize that t is merely exemplary.

Figure 3A:
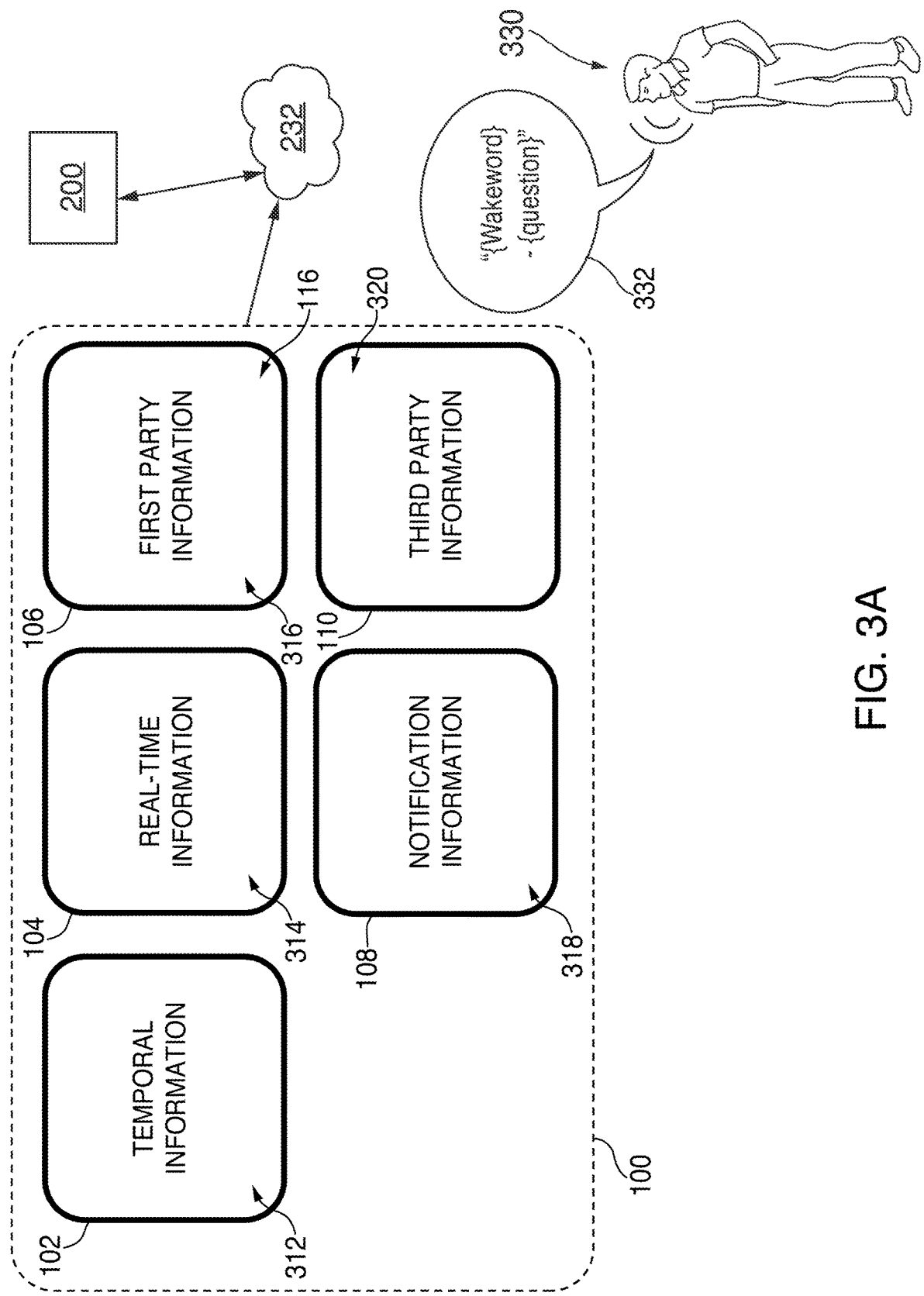
FIGS. 3A and 3B are illustrative diagrams of a display array displaying content in response to an utterance, in accordance with various embodiments.
Figure 3B:
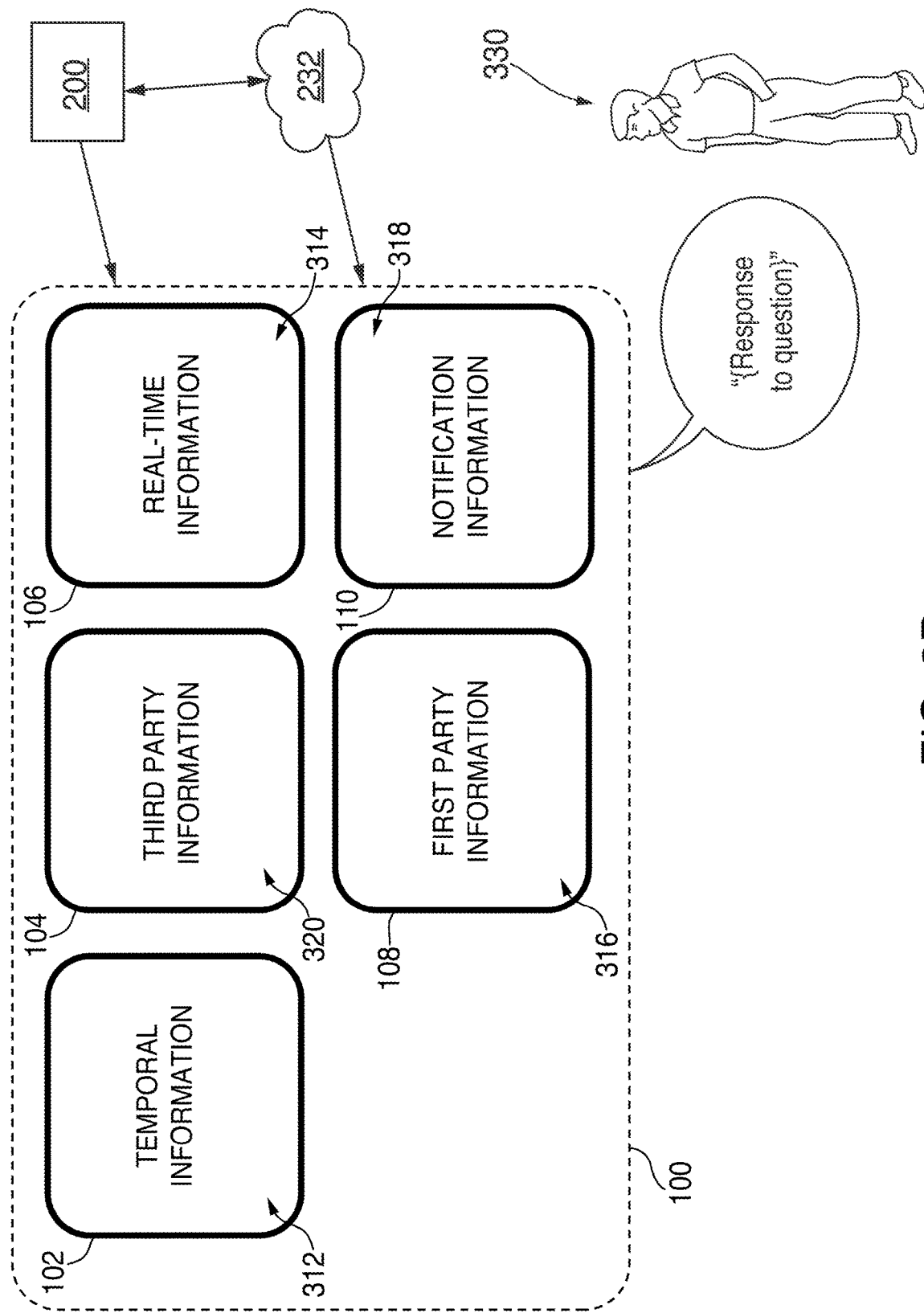

FIGS. 3A and 3B are illustrative diagrams of a display array displaying content in response to an utterance, in accordance with various embodiments. In FIG. 3A, display array 100 is shown, which may be located within a household of an individual 330. For example, display array 100 may be located on a wall within one's home. As described above, a display configuration of display devices 102-110 of display array 100 may be stored within a user profile of individual 330 stored within user accounts module 270 and/or a layout of display array 100 may also be stored by device management system 230 of computing system 200. In the illustrative embodiment, display array 100 may include first display device 102 displaying first content 312, second display device 104 displaying second content 314, third display device 106 displaying third content 316, fourth display device 108 displaying fourth content 318, and fifth display device 110 displaying fifth content 320.

In some embodiments, first content 312 may correspond to temporal information. For example, temporal information may be associated with a current time and/or date. Second content 314 may, in some embodiments, correspond to real-time information, such as a music application presenting content to an individual in real-time with real time updates. Third content 316, in some embodiments, may correspond to first party information, such an application running on computing system 200 of FIG. 2. As an illustrative example, first party information may correspond to a sports score. Fourth content 318, in one embodiment, may correspond to notification information. Notification information, for instance, may be any suitable type of information with which a notification may be generated and provided to an individual to notify that individual of a particular event that is occurring. For example, a to-do list may correspond to one type of notification information. In response to a particular event of the to-do list occurring, a notification may be provided to the individual to notify them of the event. Fifth content 320, in an embodiment, may correspond to third party information, such as weather information. In this particular scenario, the third party information may be populated by a data source external to computing system 200 (e.g., an external website).

As seen within FIG. 3A, an individual 330 may speak an utterance 332—"{Wakeword}—{Question}" (e.g., "Alexa—What is the weather like in New York City?") As discussed previously, display array 100 may include one or more microphones 208, which may receive audio signals representing utterance 332. In response to detecting a wakeword (e.g., "Alexa"), display array 100 may send audio data representing utterance 332 to speech-processing system 250 of computing system 200 using network(s) 230. Speech-processing system 250 may, in response to receiving the audio data, generate text data representing the audio data by performing speech-to-text processing to the audio data, for example using ASR module 258. Speech-processing system 250 may then use NLU module 260 to determine an intent of utterance 332 using the generated text data.

In the illustrative embodiment, the intent of utterance 332 may correspond to a request for new content. For example, utterance 332 may be a request for weather information associated with a particular location (e.g., New York City). In response to determining the intent, speech-processing system 250 may determine a particular application, such as a weather application, with which to be used to obtain the requested content. Speech-processing system 250 may then communicate the request for the content to computing system 200, such that applications management system 240 may access the appropriate application for retrieving the requested content. In some embodiments, applications management system 240 may receive a URL directed to a web-application including the requested content. Applications management system 240 may then notify device management system 230 that newly requested content has been received, and may request a particular display device from display array 100 with which to send the URL to display the content.

In a non-limiting embodiment, device management system 230 may store a prioritization relationship for each display device of display array 100. For example, first display device 102 may be used to as a reference display, which displays a particular set of content at all times (e.g., a current time and/or date). As another example, second display device 104 may be used for displaying high-priority content/information, such as a mostly recently requested content or an update to particular content that is current being displayed by another display device of display array 100. In the illustrative embodiment, utterance 332 is directed to a request for a weather forecast. Therefore, continuing the previous example, device management system 230 may indicate to applications management system 240 that the content received from a corresponding weather application regarding a weather forecast for New York City should be displayed using second display device 104, as it is "high-priority" information.

In FIG. 3B, for instance, the various content displayed by each display device of display array 100 may change in response to utterance 320. As mentioned above, applications management system 230 may be instructed that, because audio data representing utterance 332 requested new content, that new content (e.g., content 320) is to be displayed using second display device 104, which may be assigned to display high-priority content. Applications management system 240, therefore, may send the URL for accessing the weather application to second display device 104, which may run a local client script to render content 304. For example, display device 104 may execute a local JavaScript client to run HTML, data received from a weather web-application, accessed by a URL to the weather application's website.

In addition to causing display device 104 to display content 320, device management system 230 may also indicate to applications management system 240 which display devices to use to display some or all of the previously displayed content. For instance, because content 320 had been requested (e.g., additional content from a third-party weather application), device management system 230 indicated to applications management system 240 that content 320 is to be displayed using display device 104, assigned to display high-priority content. Similarly, device management system 230 may, in some embodiments, indicate that content 314, which was previously displayed on display device 104, is to now be displayed using display device 106. For example, display device 106 may be assigned to display a next most high-priority content. This may correspond to content 314, as it was previously displayed using display device 104, used for displaying the most high-priority content. Still further, each of content 316 and 318 may be moved from being displayed by display devices 106 and 108, respectively, to being displayed by display devices 108 and 110, respectively.

In some embodiments, in response to the audio data representing utterance 332, speech-processing system 250 of computing system 200 may generate and send audio data representing a response to utterance 332. For example, speech-processing system 250 may generate audio data representing a response "{Response to question}" (e.g., "In New York City it is currently 81-degrees Fahrenheit with 80% humidity"), which may be sent to display array 100. Display array 100 may then output the audio data such that individual 330 may hear the response to their utterance, in addition to seeing the response via display device 104. In some embodiments, the content accessed by display device 104 (e.g., content 320), may include an audio file of the response to utterance 332. Thus, in this particular instance, upon accessing the web application to render content 320, display array 100 may play the audio file.

In some embodiments, device management system 230 may assign a lowest-priority content to display device 110. Therefore, because new content (e.g., content 320) was caused to be displayed by display array 100, the content previously assigned to the lowest priority display device (e.g., content 120 displayed by display device 110), may be removed from being displayed by display array 100. In this way, each of display devices 104-110 (with the exemplary exclusion of display device 102 as being used for reference display) continually is capable of displaying content in ranked order from highest priority to lowest priority.

In some embodiments, device management system 230 may store a prioritization relationship for display array 100. For example, in response to an individual configuring display array 100, device management system 230 may determine which display device to use for displaying high-priority content, low priority content, and/or any other type of content. As another example, individual 330 may alternatively assign a priority ranking to each display device of display array 100. For instance, individual 330 may assign, via voice commands, touch inputs, and/or any other suitable mechanism, each display device of display array 100 a particular priority rank, such that each instance of high-priority content may be rendered by the appropriate display device.

Figure 4:
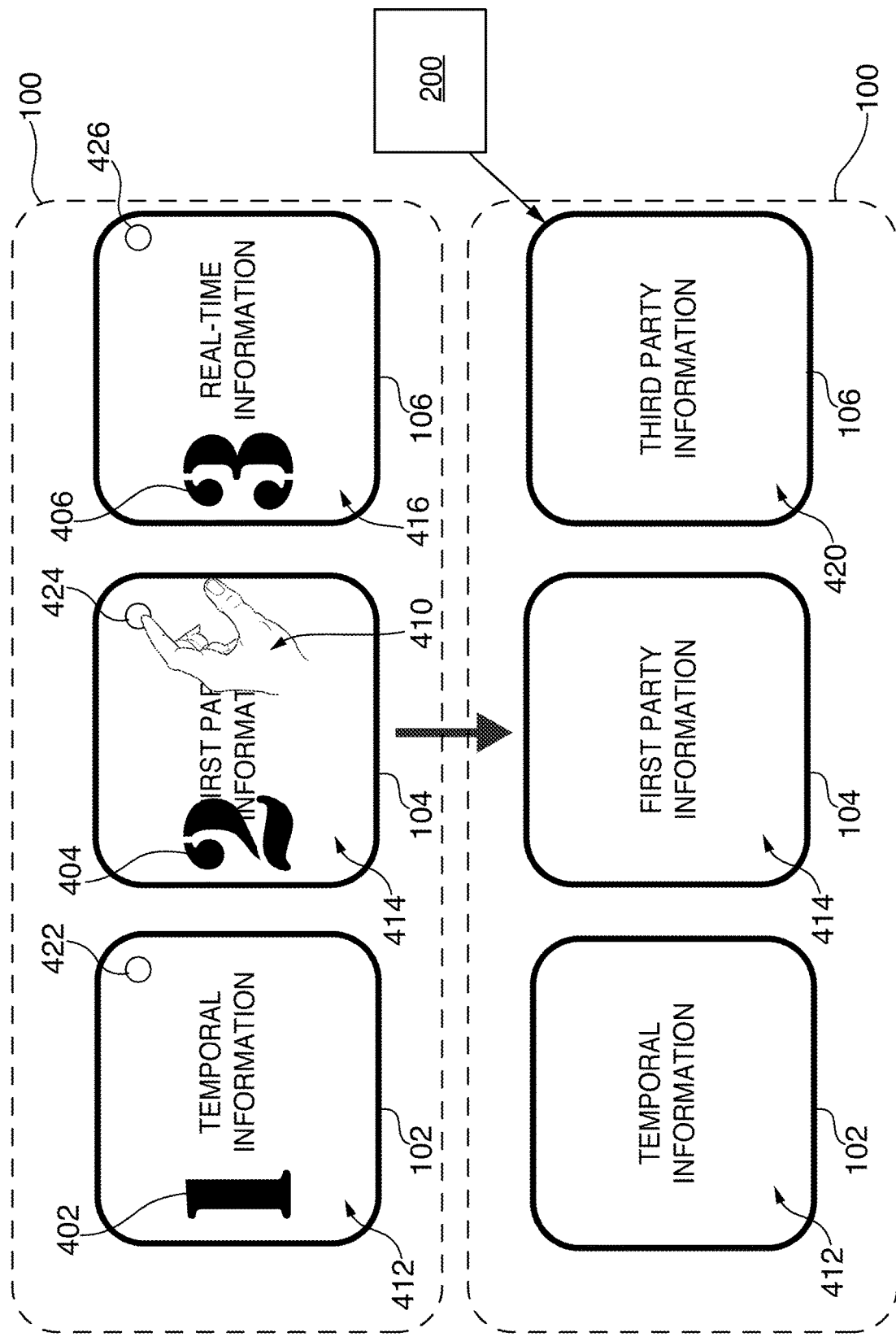
FIG. 4 is an illustrative diagram of a multi-device array being configured to continue displaying content on a particular display device in response to an input, in accordance with various embodiments.

FIG. 4 is an illustrative diagram of a multi-device array being configured to continue displaying content on a particular display device in response to an input, in accordance with various embodiments. In the non-limiting, example embodiment, display array 100 includes first display device 102 displaying first content 412, second display device 104 displaying second content 414, and third display device 106 displaying third content 416. For example, first content 412 may correspond to temporal information (e.g., a time/date application), second content 414 may correspond to a first party information (e.g., music application), and third content 416 may correspond real-time information (e.g., a sports application).

In some embodiments, an individual may cause a particular display device to be "pinned" or "locked" such that the particular display device will continue displaying certain content, regardless of any updates or requests which may be made. For instance, an individual may decide that second display device 104 is to continue displaying content 414 regardless of any updates that may occur to content 412 and 416, or any new content that is requested to be displayed by display array 100. In response to pinning a particular display device, device management system 230 may remove that display device from being available to applications management system 240 for sending content. For example, if display device 104 is pinned, then device management system 230 may remove display device 104 from a layout of display array 100 for use when communicating to applications management system 240 which display devices of display array 100 may be used for displaying updated or new content.

In some embodiments, a display device may be pinned by an individual via a touch input. For instance, display devices 102, 104, and 106 may respectively include buttons 402, 404, and 406, which may be displayed by each display device's display 212 in an upper right corner. In response to touching one of buttons 402, 404, and/or 406, a visual indicator may be displayed on each display device's display 212. For example, in response to an individual's finger 410 contacting display 212 of second display device 104, visual indicators 402, 404, and 406 may respectively be displayed by display devices 102, 104, and 106.

Upon displaying visual indicators 402, 404, and 406, an individual may select a particular display device of display array 100 with which they seek to pin the displayed content to. For example, an individual may select display device 104 such that content 414 remains displayed thereby. To select the display device, an individual may tap, touch, swipe, or perform any other suitable touch gesture to display 212 of the corresponding display device. Furthermore, an individual may alternatively press a physical button of that display device. Still further, an individual may speak an utterance indicating the selected display device. For example, an individual may speak an utterance, "Alexa—pin display device number two." The utterance may be spoken after visual indicators 402, 404, and 406 are displayed, however this is merely exemplary. In response to determining that the utterance includes the wakeword, "Alexa," display array 100 may send audio data representing the utterance to speech-processing system 250, which may determine that the intent of the utterance is for second display device 104 to have its content pinned. Speech-processing system 250 may then notify device management system 230 that display device 104 is, until instructed otherwise, unavailable for displaying updated or new content. Therefore, applications management system 240 will not send any new URLs to second display device 104, such that the content of the particular web application remains rendered by display device 104.

In an illustrative embodiment, content 414 may be pinned to display device 104. If display device 104 was previously assigned to display high-priority content, such as an update to currently displayed content or newly requested content, then that high-priority content will be displayed using a different display device of display array 100. For example, in response to utterance 320 of FIGS. 3A and 3B, applications management system 240 may determine an appropriate application to use for obtaining content associated with utterance 320, and may request an available display device of display array 100 from device management system 230. Device management system 230, for instance, may have previously indicated that high-priority content, such as newly requested content, should be displayed by display device 104. However, in response to display device 104 being pinned to display content 414, device management system 230 may indicate to applications management system 240 that display device 106 is now to be used for displaying high-priority content. Therefore, application management system 240 may generate and send a URL for accessing the requested content to display device 106, which in turn may render content 420 thereby. For instance, as the weather forecast in New York City was requested by utterance 320, applications management system 240 may send a URL for a weather web-application including the weather forecast for New York City to display device 106. Display device 104, in this example, will continue to display content 414 associated with a music application.

Figure 5:
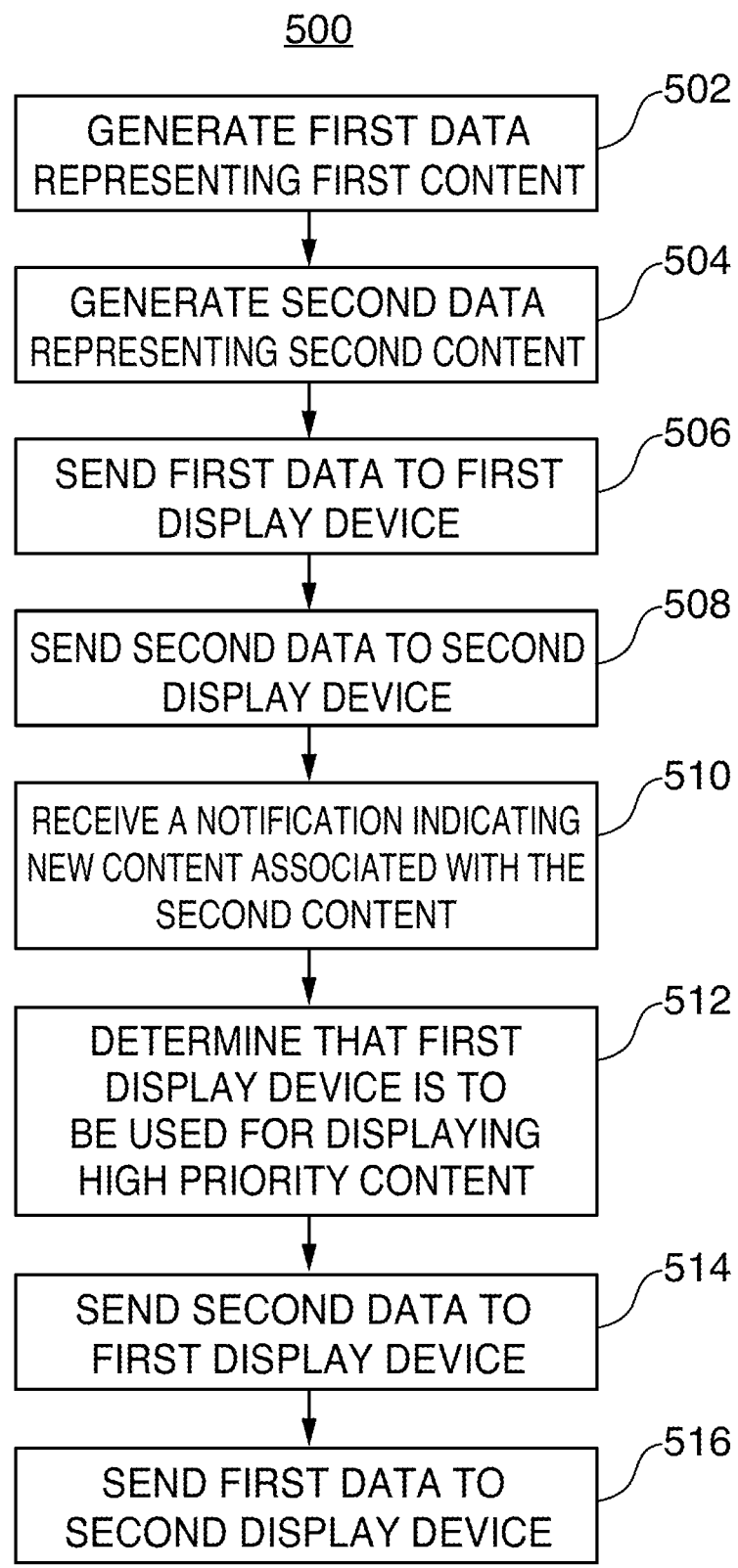
FIG. 5 is an illustrative flowchart of a process for modifying content displayed by one or more display devices of a multi-device, in accordance with various embodiments.

FIG. 5 is an illustrative flowchart of a process for modifying content displayed by one or more display devices of a multi-device, in accordance with various embodiments. Process 500, in one non-limiting embodiment, may begin at step 502. At step 502, first data representing first content may be generated by a computing system. For instance, computing system 200 may include applications management system 240, which may determine an appropriate web application for accessing certain content, and may generate a URL that may be used by a local client device (e.g., a display device) to render that content. For example, an individual may request, either via a voice command or a manual input (e.g., one or more touch inputs) that a particular song be played using display device 104. In response, applications management system 240 may access a music application capable of playing that song, and may generate for displaying content 114 indicating information associated with the song (e.g., song title, artist name, etc.). Furthermore, the URL may also allow display device 104 to play an audio file of the song (e.g., an MP3 file) using speaker(s) 210 of display array 100.

At step 504, second data representing second content may be generated by computing system 200. Similarly to step 502, applications management system 240 may determine an appropriate web application for accessing certain content to be displayed by a second display device (e.g., display device 106), and may generate a URL for accessing that content from the web application. As an illustrative example, the second URL may be directed to accessing a score of a football game using a sports application, such as content 116. In some embodiments, the first URL and the second URL may both be directed to a same web application. For example, the first URL may be for a weather application, and may associated with a weather forecast for a first location, whereas the second URL may also be for the weather application, albeit the second URL may be associated with a weather forecast for a second location.

At step 506, the first data may be sent to the first display device. In one embodiment, after generating the first URL for the first content, applications management system 240 may request an available display device of display array 100 with which to use to send the first URL. For instance, applications management system 240 may request an available display device from screen management application 230, which has a prioritization layout and configuration of the various display devices of display array 100 stored thereon. In response to the request, device management system 230 may indicate that display device 104 is to be used to display the first content rendered by the first URL, and therefore applications management system 240 may send the first URL to display device 104 to be displayed thereby. Similarly, at step 508, the second data may be sent to a second display device such that the second content associated with the second URL may be displayed thereby. For instance, applications management system 240 may request another available display device from screen management application 230, which in turn may indicate that display device 106 may be used to display content 106. Thereafter, applications management system 240 may send the second URL to display device 106 such that content 106 may be displayed thereby.

At step 510, a notification may be received by applications management system 240 that indicates that there is new content associated with the second content. Using the illustrative example of FIGS. 1A and 1B, the new content may correspond to an update to a score of the football game, which is currently being displayed by display device 106. In response to receiving the notification, applications management system 240 may send a request to screen management application 230 that requests a display device with which the updated content should be displayed by.

At step 512, a determination may be made that the first display device is to be used to display higher prioritized content. As mentioned previously, device management system 230 may store a prioritization relationship for the display devices of display array 100. The prioritization relationship may indicate which display device is to be used to display a highest priority content, a next highest priority content, and so on. Device management system 230, in one embodiment, may receive a configuration of the display devices of display array 100, and may determine the prioritization relationship for those display devices. As an illustrative example, display device 104 may be assigned for displaying a highest priority content, while display device 106 may be assigned for displaying a next most high priority content.

In some embodiments, applications management system 240 may determine that any time updates to content being displayed by one of display devices 102-110 of display array 100 is received, then that updated content is to be displayed by the display devices assigned to display the high priority content. For example, content 114 may be displayed by display device 104 while content 116 may be displayed by display device 106. In response to receiving the notification, applications management system 240 may determine that content 116 should now be displayed by display device 104, as display device 104 is assigned, under one exemplary prioritization relationship, as being the display device to display higher priority content.

Process 500 may then proceed to step 514. At step 514, the second data may be sent to the first display device. For instance, as seen in FIG. 1B, content 154 corresponding to the score of a football game, which was previously displayed by display device 106, may now be displayed by display device 104. Furthermore, at step 516, the first data may be sent to the second display device. Continuing the aforementioned example, content 156, which was previously displayed by display device 104, may now be displayed by display device 106, as content 156 has a lower priority than content 154.

Figure 6:
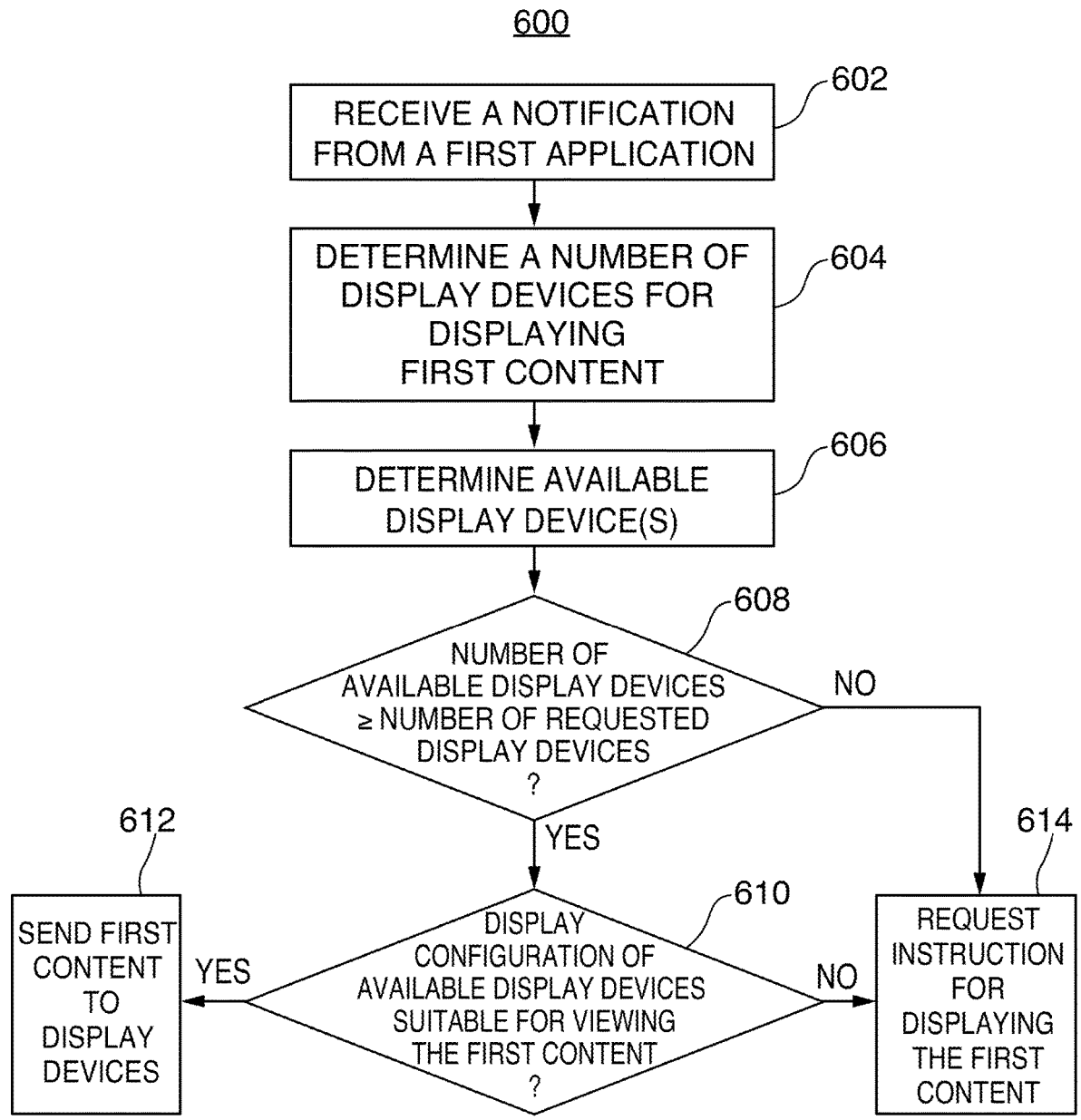
FIG. 6 is an illustrative flowchart of a process for determining display device availability for displaying content, in accordance with various embodiments.

FIG. 6 is an illustrative flowchart of a process for determining display device availability for displaying content, in accordance with various embodiments. Process 600, in one non-limiting embodiment, may begin at step 602. At step 602, a notification may be received from a first application at application management system 240 of computing system 200. In some embodiments, the notification may indicate that a change in a priority level of content currently being displayed by one or more display devices 102-110 of display array 100 has changed. For example, applications management system 240 may receive a notification, or may determine itself, that a change in the HTML, data has occurred. For instance, HTML, data indicating a score for a "Team B" may have changed from the number "3" to the number "10."

In some embodiments, applications system 240 may determine that any instance of the HTML data changing, and this the content that would be displayed by a display device running a local client script to render that HTML data would be classified as having a high priority level. However, in additional embodiments, requests for additional content not currently being displayed by a display device of display array 200 cause that additional content that is received to be classified as having a high priority level. For example, an individual may speak an utterance requesting a weather forecast for New York City. Computing system 200 may then determine that, because that content was requested, it will be classified as having the high priority level.

In some embodiments, computing system 200 may then determine which display device of display array 200 to use to display the content having the high priority level. For example, a left most screen (e.g., screen 102) may be assigned to be used for displaying content having the high priority level. Computing system 200, and in particular, for instance, device management system 230, may store a prioritization relationship for display array 200. For example, device management system 230 may store a display configuration of display array 200, and may be assigned, or receive a selection of which display device of display array 200 is to be assigned, content having a particular priority level (e.g., content having a high priority level ("high priority content"), content having a low priority level ("low priority content"), and content having any other suitable priority level).

At step 604, a determination may be made as to a number of display devices needed to properly display first content received from the first application. In some embodiments, local client scripts of computing device 220 (e.g., applications management system 240), may determine that, based on the HTML data received from the first application, more than one display device of display array 200 is needed to properly display the first content. For example, the first content may require two display devices, horizontally parallel to one another, to display the first content such that the first content is logically viewable by an individual that would view display array 200. As another example, four display displays arranged such that they form a geometric square, may be needed to display the first content properly.

At step 606, a determination may be made as which display devices are available to render content. In some embodiments, the amount of available display devices of display array 200 may be determined by device management system 230, which monitors a number of display devices activate, a display configuration, and a prioritization relationship for a particular display array (e.g., display array 200) associated with a particular user profile. Device management system 230 may monitor display array 200 dynamically such that content may be rendered by any particular display device (e.g., display devices 102-110) substantially immediately. If a particular display device is selected to be pinned, for example, then that display device may be removed from a listing of available display devices, and therefore the continue currently displayed thereby is to be continued to be displayed until instructed otherwise. Based on the display configuration of display array 200, for instance, device management system 230 may determine whether or not the display devices that are currently available are capable of properly rendering the first content such that the first content is viewable by an individual when viewing display array 200. For example, if an individual seeks to view a square image using four display devices arranged in a square (e.g., display devices 104-110), then device management system 230 will determine whether those four display devises are available (e.g., powered on, capable of accessing a web site across one or more networks, pinned/not pinned, etc.).

At step 608, a determination is made as to whether or not the number of available display devices of display array 200 is equal to or greater than the number of display devices requested by applications management system 240 to display the requested content. For instance, if applications management system 240 indicates that four display devices are needed to render the requested content viewable, device management system 230 may determine whether or not there are four display devices currently available for displaying content. As an illustrative example, to display a first image, four display devices are needed. Applications management system 240 determines, based on the HTML, data received upon accessing a particular URL, that four display are needed. Applications management system 240 may then ask device management system 230 whether there are four display devices available for display array 200.

If the number of available display devices is greater than or equal to the number of display devices requested by the application accessed by the URL, then process 600 may proceed to step 610. At step 610, a determination is made as to whether or not the display configuration of display array 200 is suitable for an individual to properly view the requested first content. For example, the first content may require two display devices located substantially parallel to one another, with a first display device being located above a second display device such that the first content may be viewed in a substantially vertical manner. Device management system 230 may store a display configuration of display array 200, which was set by an individual for their user profile. Device management system 230 may also, in one embodiment, determine which display devices are currently available for displaying content to check whether or not the display configuration of display array 200 allows for the content to be properly rendered. If so, process 600 may proceed to step 612.

At step 612, the first content may be sent to the appropriate display devices such that the first content may be displayed thereby. device management system 230 indicates to applications management system 240 that the requested content may be displayed by display array 200. Furthermore, device management system 230 indicates to applications management system 240 which display devices of display array 200 may be used to properly display the requested content. Continuing the aforementioned example, device management system 230 may indicate to applications management system 240 that a first display device and a second display device may be used to display the particular content that was requested to be displayed. Applications management system 240 may then send the proper URLs for accessing the content to those display devices such that the content may be properly viewed by an individual using display array 200.

However, if at step 610 it is determined that the configuration of the available display devices is not suitable for viewing of the requested content, then process 600 may proceed to step 614. At step 614, an instruction may be requested for displaying the first content. For instance, because the number of display devices is not enough to properly render the requested content, or that the configuration is not suitable for rendering the content, applications management system 240 may receive a request for how the content is to instead be rendered. For example, the applications management system 240 may determine, based on instructions from a corresponding application, that the requested content may be displayed by any currently available display devices. For example, if the first content requires two display devices substantially horizontally parallel and adjacent to one another, device management system 230 may determine that while there are two display devices available, they are not adjacent to one another. Therefore, device management system 230 may indicate to applications management system 240 that the requested content may not be able to be displayed properly by display array 200, and may either cause the content to be displayed using the available display devices, or may provide a notification to an individual operating the display array that indicates that the content may not be viewable in an appropriate manner if displayed, and thereafter requests the individuals instructions for whether to proceed or not.

Similarly, if at step 610 it is determined that there are less display devices available for display array 200 than requested for displaying the first content, then device management system 230 may indicate to applications management system 240 that there are not enough available display devices for rendering the content properly. In this particular scenario, process 600 may proceed to step 614, as described above.

However, at step 614, applications management system 240 may alternatively communicate with a corresponding application associated with the content to be rendered, and inform that application that the content is not capable of being optimally displayed. In this particular scenario, the corresponding application may instruct the applications management system of a new display configuration to use to display the requested content. For example, if four display devices arranged in a square shape were requested, but not available, applications management system 240 may communicate to a corresponding application that the square shape array is not available. In response, the application may instruct applications management system 240 to attempt to display the requested content in a new format (e.g., using a single display device). In this particular scenario, process 600 may be repeated in an attempt to determine whether or not the new format is capable of being used to render the content.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A computer-implemented method, comprising:
receiving first content;
presenting the first content on a first display of a plurality of displays;
receiving first data indicating that a user has more recently interacted with the first display than a second display of the plurality of displays;
receiving second content; and
based at least in part on the first data, presenting the second content on the second display.

2. The computer-implemented method of claim 1, further comprising:
determining that the second content corresponds to a higher priority than the first content,
wherein presenting the second content on the second display is further based at least in part on the higher priority.

3. The computer-implemented method of claim 1, further comprising:
determining that the second content corresponds to a notification,
wherein presenting the second content on the second display is further based at least in part on the second content corresponding to the notification.

4. The computer-implemented method of claim 1, further comprising:
determining that the first display corresponds to a state wherein display of the first content is to be maintained,
wherein presenting the second content on the second display is further based at least in part on the state.

5. The computer-implemented method of claim 4, wherein the first display corresponds to a first device and the method further comprises:
determining, by a management component of the first device, to present the second content on the second display.

6. The computer-implemented method of claim 1, wherein the first display corresponds to a first device and the second display corresponds to a second device.

7. The computer-implemented method of claim 1, further comprising:
determining, based at least in part on a touch input, that the user has more recently interacted with the first display than the second display.

8. The computer-implemented method of claim 1, further comprising:
determining, based at least in part on an audio input, that the user has more recently interacted with the first display than the second display.

9. The computer-implemented method of claim 1, further comprising:
determining that the second content comprises an update of previous content presented on the second display.

10. The computer-implemented method of claim 1, wherein the second content corresponds to a messaging service.

11. A system comprising:
at least one processor; and
at least one memory comprising instructions that, when executed by the at least one processor, cause the system to:
receive first content;
present the first content on a first display of a plurality of displays;
receive first data indicating that a user has more recently interacted with the first display than a second display of the plurality of displays;
receive second content; and
based at least in part on the first data, present the second content on the second display.

12. The system of claim 11, wherein the at least one memory further comprises instructions that, when executed by the at least one processor, further cause the system to:
determine that the second content corresponds to a higher priority than the first content,
wherein the instructions that cause the system to present the second content on the second display are further based at least in part on the higher priority.

13. The system of claim 11, wherein the at least one memory further comprises instructions that, when executed by the at least one processor, further cause the system to:
determine that the second content corresponds to a notification,
wherein the instructions that cause the system to present the second content on the second display are further based at least in part on the second content corresponding to the notification.

14. The system of claim 11, wherein the at least one memory further comprises instructions that, when executed by the at least one processor, further cause the system to:
determine that the first display corresponds to a state wherein display of the first content is to be maintained,
wherein the instructions that cause the system to present the second content on the second display are further based at least in part on the state.

15. The system of claim 14, wherein the first display corresponds to a first device and the at least one memory further comprises instructions that, when executed by the at least one processor, further cause the system to:
determine, by a management component of the first device, to present the second content on the second display.

16. The system of claim 11, wherein the first display corresponds to a first device and the second display corresponds to a second device.

17. The system of claim 11, wherein the at least one memory further comprises instructions that, when executed by the at least one processor, further cause the system to:
determine, based at least in part on a touch input, that the user has more recently interacted with the first display than the second display.

18. The system of claim 11, wherein the at least one memory further comprises instructions that, when executed by the at least one processor, further cause the system to:
determine, based at least in part on an audio input, that the user has more recently interacted with the first display than the second display.

19. The system of claim 11, wherein the at least one memory further comprises instructions that, when executed by the at least one processor, further cause the system to:
determine that the second content comprises an update of previous content presented on the second display.

20. The system of claim 11, wherein the second content corresponds to a messaging service.

* * * * *